United States Patent
Bishel

(10) Patent No.: US 10,104,150 B2
(45) Date of Patent: *Oct. 16, 2018

(54) INTERNET/INTRANET-CONNECTED APPARATUS

(71) Applicant: Sony Corporation, Tokyo (JP)

(72) Inventor: Richard Anthony Bishel, Beaverton, OR (US)

(73) Assignee: Sony Corporation, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 14/622,685

(22) Filed: Feb. 13, 2015

(65) Prior Publication Data

US 2015/0304385 A1 Oct. 22, 2015
US 2017/0155700 A9 Jun. 1, 2017

Related U.S. Application Data

(60) Continuation of application No. 13/224,957, filed on Sep. 2, 2011, now Pat. No. 8,996,628, which is a continuation of application No. 12/804,187, filed on Jul. 15, 2010, now abandoned, which is a division of application No. 10/214,086, filed on Aug. 6, 2002, now Pat. No. 7,761,555.

(51) Int. Cl.

| | |
|---|---|
| *G06F 15/16* | (2006.01) |
| *H04L 29/08* | (2006.01) |
| *H04L 29/06* | (2006.01) |
| *H04L 12/58* | (2006.01) |
| *H04L 12/28* | (2006.01) |
| *G05B 15/02* | (2006.01) |
| *H02J 3/00* | (2006.01) |

(52) U.S. Cl.
CPC ............. *H04L 67/02* (2013.01); *G05B 15/02* (2013.01); *H02J 3/00* (2013.01); *H04L 12/2816* (2013.01); *H04L 51/046* (2013.01); *H04L 67/06* (2013.01); *H04L 67/125* (2013.01); *H04L 69/161* (2013.01)

(58) Field of Classification Search
CPC .. H04L 43/065; H04L 65/1069; H04L 65/102
See application file for complete search history.

(56) References Cited

U.S. PATENT DOCUMENTS

| | | |
|---|---|---|
| 4,200,862 A | 4/1980 | Campbell et al. |
| 5,463,286 A | 10/1995 | D'Aleo et al. |
| 5,576,700 A | 11/1996 | Davis et al. |
| 5,949,779 A | 9/1999 | Mostafa et al. |
| 5,956,487 A | 9/1999 | Venkatraman et al. |
| 5,973,696 A | 10/1999 | Agranat et al. |
| 5,991,795 A | 11/1999 | Howard et al. |

(Continued)

OTHER PUBLICATIONS

Ames, "Building an Embedded Web Server from Scratch," Issue 91, Feb. 1998, pp. 20-23.

(Continued)

*Primary Examiner* — Yves Dalencourt
(74) *Attorney, Agent, or Firm* — Wolf, Greenfield & Sacks, P.C.

(57) ABSTRACT

A method and apparatus that uses the Internet protocol, TCP/IP, for a home control network. The invention also provides embedded servers, email clients at the electrical boxes. The invention integrates the Internet to the electrical outlet, switch, or appliance boxes using a low cost embedded web server.

17 Claims, 24 Drawing Sheets

(56) References Cited

U.S. PATENT DOCUMENTS

| | | | |
|---|---|---|---|
| 6,157,943 | A | 12/2000 | Meyer |
| 6,182,094 | B1 | 1/2001 | Humpleman et al. |
| 6,198,479 | B1 | 3/2001 | Humpleman et al. |
| 6,229,432 | B1 | 5/2001 | Fridley et al. |
| 6,232,675 | B1 | 5/2001 | Small |
| 6,281,784 | B1 | 8/2001 | Redgate et al. |
| 6,282,454 | B1 | 8/2001 | Papadopoules et al. |
| 6,288,716 | B1 | 9/2001 | Humpleman et al. |
| 6,363,057 | B1 | 3/2002 | Ardalon et al. |
| 6,370,448 | B1 | 4/2002 | Ecgurek |
| 6,377,570 | B1 | 4/2002 | Vaziri et al. |
| 6,385,732 | B1 | 5/2002 | Eckel et al. |
| 6,653,933 | B2 | 11/2003 | Raschke |
| 6,759,956 | B2 | 7/2004 | Menard et al. |
| 6,847,293 | B2 | 1/2005 | Menard et al. |
| 6,854,059 | B2 | 2/2005 | Gardner |
| 6,894,609 | B2 | 5/2005 | Menard et al. |
| 6,970,917 | B1 | 11/2005 | Kushwaha et al. |
| 6,993,289 | B2 | 1/2006 | Janik |
| 7,245,212 | B2 | 7/2007 | Cope et al. |
| 7,761,555 | B1 | 7/2010 | Bishel |
| 8,996,628 | B2 | 3/2015 | Bishel |
| 2001/0025307 | A1 | 9/2001 | Venkatraman et al. |
| 2001/0034754 | A1 | 10/2001 | Elwahab et al. |
| 2001/0034777 | A1 | 10/2001 | Venkatraman et al. |
| 2001/0034778 | A1 | 10/2001 | Venkatraman et al. |
| 2001/0034779 | A1 | 10/2001 | Venkatraman et al. |
| 2001/0034780 | A1 | 10/2001 | Venkatraman et al. |
| 2001/0034781 | A1 | 10/2001 | Venkatraman et al. |
| 2001/0044751 | A1 | 11/2001 | Pugliese, III et al. |
| 2001/0044836 | A1 | 11/2001 | Venkatraman et al. |
| 2002/0002627 | A1 | 1/2002 | Stead et al. |
| 2002/0010518 | A1* | 1/2002 | Reid .................. G06Q 10/087 700/31 |
| 2002/0027504 | A1 | 3/2002 | Davis et al. |
| 2002/0040397 | A1 | 4/2002 | Choi |
| 2002/0112047 | A1 | 8/2002 | Kushwaha et al. |
| 2002/0186125 | A1 | 12/2002 | Li |
| 2003/0208297 | A1* | 11/2003 | Stawikowski .......... H04L 67/02 700/219 |
| 2004/0138835 | A1 | 7/2004 | Ransom et al. |
| 2010/0293241 | A1 | 11/2010 | Bishel |
| 2011/0320059 | A1 | 12/2011 | Bishel |

OTHER PUBLICATIONS

Eady, "Weaving an embedded web," Computer Design, Sep. 1997, retrieved from "www.computer-design.com/editorial/1997/09/Sup/997web.html" (6 pages).

Linksys, "Exploring Home Networking," Nov. 2000, retrieved from "www.Linksys.com/products/images/homenetworkinglinksys.pdf" (14 pages).

Agranet, "Embedded Web Services in Network Drives," Computer System Design, Mar. 1998 retrieved from "www.csdmag.com/main/9803" (6 pages).

Dutta-Ray "Networkds for Homes," Homes Networks, Mar. 2000, vol. 2, No. 3, pp. 1-10.

Freyder, et al., "Look Ma, No PG," Circuit Cellar, Aug. 2000, Issue 121, pp. 20-29.

Loewen, "Internet Appliance Interface," Circuit Cellar, Jul. 1999, issue 108, pp. 24-34.

Bentham, "TCP/IP Lean-Web Servers for Embedded Systems," 2000, ppp. 269, 291-296, and 331-332.

Briere et al., "Smart Homes for Dummies," 1999, pp. 201-229, 269-286, and 293.

Borriello et al., "Embedded Computation Meets the Worldwide Web," Communications at the AGM, May 2000, vol. 43, No. 5.

"MasterSwitch™ provides complete Web and SNMP management and control of your network's power," APC, Mar. 5, 1998 (4 pages).

"MasterSwitch Power Distribution Unit User's Guide," APC, Jul. 2001 (57 pages).

Steinfeld, "Embedded Web Servers Invade SOHO," Dedicated Systems Magazine, 2004 (5 pages).

* cited by examiner

FIG. 16

INTERNET/INTRANET-CONNECTED APPARATUS

RELATED APPLICATIONS

This application is a continuation of and claims the benefit of priority to U.S. application Ser. No. 13/224,957, Sep. 2, 2011 (now allowed), which is a continuation of U.S. application Ser. No. 12/804,187, filed Jul. 15, 2010, which is a divisional of U.S. patent application Ser. No. 10/214,086, filed on Aug. 6, 2002, which issued as U.S. Pat. No. 7,761,555 on Jul. 20, 2010. The contents of the above-referenced applications are expressly incorporated herein by reference in their entireties.

TECHNICAL FIELD

This disclosure relates generally to home networks and more particularly to TCP/IP-enabled electrical boxes for controlling and monitoring lighting, outlets, and servers via the home Intranet or Internet.

BACKGROUND INFORMATION

Current home or industrial networking technologies have two separate networks. One network connects the PCs to the Internet via a dial-up phone, cable, xDSL, or Ethernet connection, and another network such as CEBus™, LonWorks™, or X-10™ controls appliances or equipment. CEBus™ was developed by the Electronics Industries Association, LonWorks™ was developed by Echelon Corp. of California, and X-10™ components are manufactured by X-10 Limited of Hong Kong. When one wants to remotely control the appliance via the Internet, one needs a converter, a specialized gateway, or software in a computer to interface between the Internet and the other networks.

For example, U.S. Pat. No. 4,200,862 shows one popular protocol called X-10™ used in homes to control lights and appliances. It uses dedicated transmitters at various locations in the home to control slave receivers that are designed to plug into the electrical outlets or designed to replace existing switches or outlets. The protocol is very restrictive and cannot handle very much data since it transmits 120 data bits/s over the existing power lines. To communicate on the Internet, a PC or similar device with proprietary software is needed to convert information and control data from the X-10™ system to the Internet. Similarly, LonWorks™ and CEBus™ are two other networks that are being used in the home to control lights and appliances.

U.S. Patent Application 2001/0034754 A1 defines a specialized gateway between CEBus™, LonWorks™, or X-10™ and the Internet as an attempt to solve the issue of remotely controlling the lights and appliances.

U.S. Pat. No. 5,949,779 discusses remotely controlling home electrical outlets and appliances by the CEBus™ protocol and proprietary BAN, Broadcast Access Network. A converter is needed to link the two systems. U.S. Patent Application No. 2002/0002627 A1 describes a scheme to control devices remotely, but uses a home protocol as described in U.S. Pat. No. 5,991,795, and a specialize gateway called emGateway™. U.S. Patent Application No. 2002/0027504 A1 describes an embodiment that allows devices attached to the Internet to communicate to dedicated sensors via a site controller that translates the wireless sensors information to the Internet. This also is a dedicated proprietary device that requires specialized software.

U.S. Pat. No. 6,370,448 B1 describes a process device, which is attached to a process communication network and then to the Internet via a process communicator. The process communication network is one of the following types: low-speed Fieldbus protocol H1), high-speed Fieldbus protocol (H2), or similar types. The process communicator converts the process communication protocol from each node link, which contains Internet address information to Ethernet data network, which connects to the Internet. Similarly, U.S. Pat. No. 6,363,057 B1 describes an electronics meter, which incorporates a TCP/IP protocol suite and an HTTP server to provide direct access to the meter data via the Internet. However, it too relies on a specialized gateway to a non-TCP/IP network such as CEBus™.

U.S. Pat. No. 5,956,487 talks about incorporating a web access in a wide variety of devices including office equipment, home-based equipment, and lab equipment, as well as a variety of other types of devices commonly that provide device specific user interface functions. Office equipment devices typically include printers and copiers. Home-based devices include home entertainment equipment such as televisions, video recorders, and audio players as well as security systems, and appliances. Lab equipment includes measurement devices such as oscilloscopes and spectrum analyzers. Web server functionality embedded in the device allows a web browser to access user interface functions for the device through a web page. These types of devices have the computing power, or can be easily added to the device, to provide web server functionality. U.S. Pat. No. 5,956,487 further describes devices that control the user interface to the device but does not describe control of house lighting and electrical outlets or control of power to the device. In fact, every home appliance or home entertainment equipment must have this web server functionality to control its operation via the Internet. This would limit such control to devices with this web server functionality and would not allow control of existing home appliances or home entertainment equipment.

U.S. Pat. No. 6,198,479 B1 describes a home network with browser-based command and control for TV or audio equipment that uses a software agent. A software agent is executed on the client device to cause a user interface to be displayed on the client device. The devices described in U.S. Pat. No. 6,198,479 B1 are entertainment equipment, and the home network is the Internet within the home which connects PCs. The control of home entertainment equipment would be limited to devices with this specialized software agent and would not allow control of existing home appliances or home entertainment equipment.

All previous art describes systems that require a specialized converter or gateway to translate the home control network such as CEBus™, X-10™, and LonWorks™ to the TCP/IP protocol of the home Intranet network or requires that the TCP/IP protocol be incorporated in the appliance or home device. The major disadvantage of the current approaches is that there are too many different types of home networks. Each type of network has specialized controllers to control the electrical load. The proprietary converters or gateways require specialized software for the different networks, and this specialized software needs to be updated with new software when new devices are added to these home control networks. The consumer may be overwhelmed with what equipment to purchase, and in many cases a specialist would be required to install and verify the proper operation. Also, with TCP/IP embedded in the home appliance or equipment, the existing home appliances and equipment could not be controlled over the home Intranet. Therefore, there exists a need for an apparatus that incorporates the TCP/IP protocol into the home electrical boxes so as to have the same home Intranet that connects PCs, printers, and other web appliances to be used for control over existing home appliances, entertainment equipment, and electrical loads. Using a standardized TCP/IP protocol for the home control network would allow the use of standardized web browsers such as Microsoft Internet Explorer or Netscape Communicator to view the electrical load status or to control the AC electrical load without using a dedicated controller or a web-based home appliance or equipment.

SUMMARY OF THE DISCLOSURE

Certain embodiments described herein are capable of solving the problems cited above. One example embodiment is an apparatus that uses a common communication standard for information, such as the TCP/UDP/IP protocol, to control electrical loads and/or sensors, to monitor a house or other dwelling or structure using sensors, and to provide numerous other capabilities when attached to the Internet or Intranet. The apparatus is mountable within an electrical box, in particularly, a standard AC electrical box.

Certain embodiments may integrate the TCP/UDP/IP protocol in the electrical outlets, switches, and other electrical boxes. With this capability, the home Intranet used to connect Internet appliances such as PCs, printers, and others can be used also for controlling and monitoring the electrical connections in the electrical boxes.

Certain embodiments may incorporate a web server in the electrical box to monitor and control items attached or connected to the electrical box via a web browser. This web browser can be executing on, for examples, a local PC connected to the home Intranet or a remote PC connected to the World Wide Web, the Internet. The web browser can request information from the apparatus called AC power circuit using the HTTP protocol. The apparatus within the electrical box can respond with an HTML or XML formatted web page. The web page may contain CGI or other server-controlled capabilities to allow control of an attached electrical load, to change information on the web page, or to alter the monitoring sensor characteristics.

Certain embodiments may provide e-mail capability in the electrical box to send e-mail upon activation of a light switch, a motion sensor, or any other attached sensors, or programmed conditions. One can monitor the electrical power status of the light, HVAC system, or attached appliance, and send e-mail if the attached device is not working or consuming too much electrical power. In addition, one can send e-mail to the electrical box to turn an electrical load ON or OFF, to update stored information such as a software program attached to the e-mail, or to accomplish a number of other tasks associated with e-mail capability. With a camera sensor designed within the AC power circuit, one can send e-mail with attached picture to indicate the presence of school children, for example.

Certain embodiments can control lights, outlets, and electrical boxes via a connection to the Internet or Intranet whether the connection is within the home or remote. An application program on a device such as the PDA, PC, laptop, or web-enabled phone may communicate directly to the electrical box via a protocol such as TCP/IP or UDP/IP. Each AC power circuit within each electrical box may have a unique IP number by which any device using an instant messaging protocol can control the electrical box's AC power to its electrical load, can check the sensor incorporated within or attached to the electrical box, or can transmit a voice message. In one embodiment, the electrical box is controlled using the Internet protocol and instant messaging capability. Any Internet-connected devices with an instant messaging protocol such as AOL instant messaging, Microsoft instant messaging protocol, or some other instant messaging scheme can control the attached appliances to the electrical box. A web browser is not needed to display a web page in this particular configuration. The AC power circuit within the electrical box can send status information upon an instant messaging request from the Internet-connected device. This allows Internet-controlled devices with small screens such as web-enable phones, PDAs, or web-enabled pages to control the lights and appliances in the home.

Certain embodiments can collect information on an attached sensor or electrical load and store it within its memory until a pre-programmed time interval, pre-programmed amount of data, or some other event that indicates the AC power circuit to transmit the information to some server for data collection or requested to do so by a web client or Internet-connected device. With this capability, the AC power circuit can monitor such thins as the amount of electrical power consumed by the attached device, the number of activations of a switch, the number of times a room is occupied, the number of times an electrical outlet is used, the temperature of the room, the number of times an appliance is being used and at what times. With this information, people can determine the amount of electrical power consumed by the household and what appliances are the major users. Homeowners or occupants can determine which rooms are being heated or cooled, and which rooms are occupied. By examining this information, one can determine the efficiency of the HVAC system. Other information can be collected to help the home occupants live a better life.

Certain embodiments can use wired and wireless home Intranet technologies as the network interfaces of the AC power circuit. Wired technologies such as phone lines, Ethernet (CAT 5 cable), and powerline communication technology are a few of the current types. Phone lines technology utilizes the existing telephone networks to transmit data. Ethernet wired technology uses a dedicated cable such as CAT5. Newer Homes are being built with CAT5 cabling throughout the homes. PCs, printers, and the electrical boxes described herein may be connected via a hub. Powerline technology uses the existing electrical wires to transmit data.

Wireless technologies such as IEEE 802.11 (known as wireless Ethernet), HomeRF™ (developed by HomeRF Working Group), and Bluetooth™ (Bluetooth Signal, Inc.) are some of the current types that can be used.

Some embodiments may utilize single-wire connection or dual-wire connection to the AC power circuit. Using single-wire AC power circuit allows for incorporating the TCP/IP capability in older homes using wireless or powerline communication technologies.

BRIEF DESCRIPTION OF THE DRAWINGS

FIG. 16 is a schematic of one implementation of the AC power circuit that is connected to the phone lines and controls an electrical load in series with the circuit.

DETAILED DESCRIPTION OF EMBODIMENTS

Figure 1:
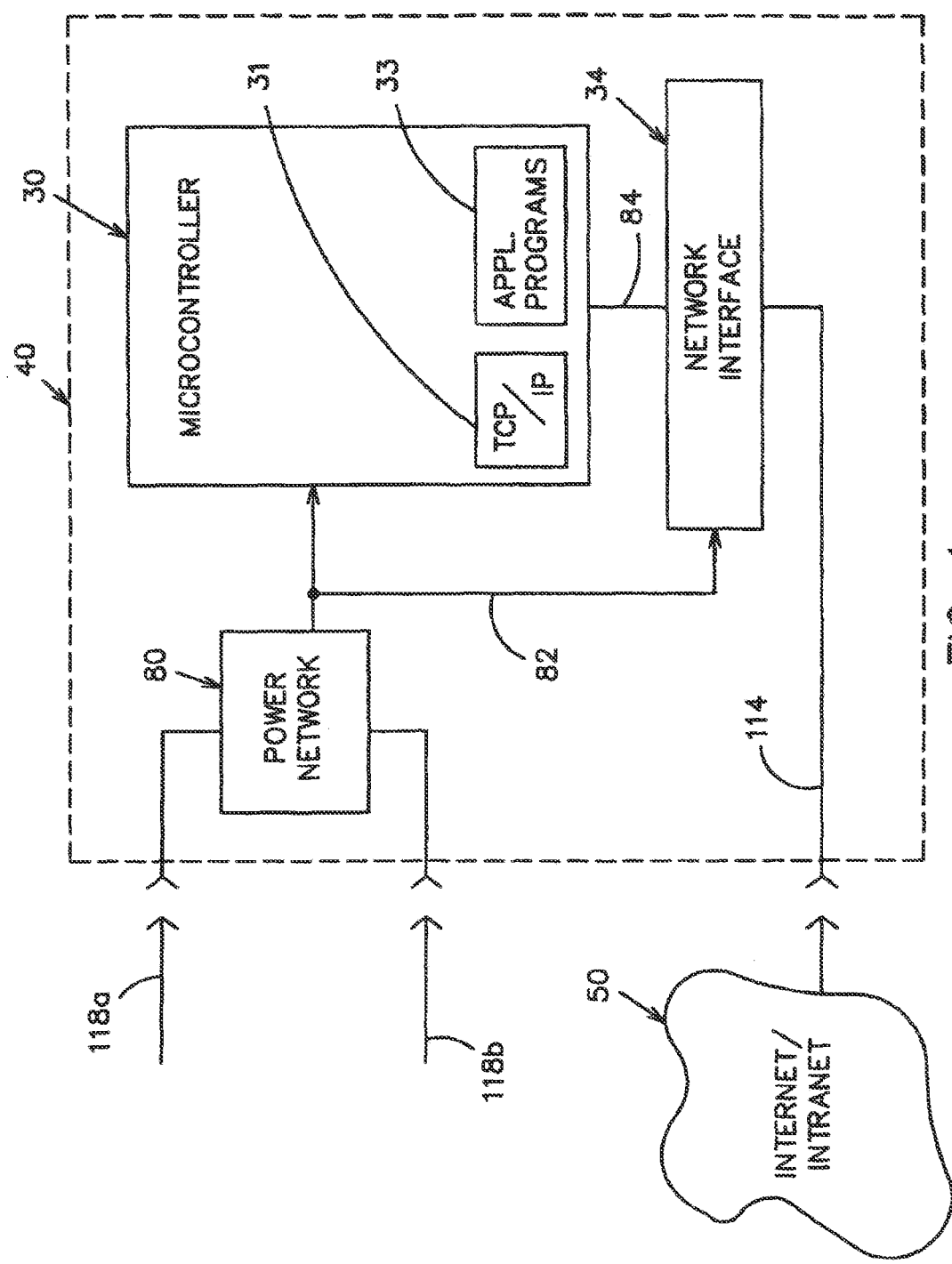
FIG. 1 is a block diagram of the AC power circuit of one example embodiment showing the basic circuit blocks.

FIG. 1 is a block diagram schematic of an AC power circuit 40 in which AC power from AC source leads 118*a* and 118*b* is applied to the AC power circuit 40, which is connected to the Internet/Intranet 50 via a communication connection 114. The AC power circuit 40 includes a power network 80, a microcontroller 30, and a network interface 34. The power network 80 provides low voltage through line 82 to operate the microcontroller 30 and network interface circuitry 34. The microcontroller 30 contains an Internet protocol stack 31 and an application program 33. The microcontroller 30 is connected to the network interface 34 via a connection 84. The microcontroller 30 runs one or more application programs 33 that can respond to a web browser request or an internet request, send e-mail, collect data, control an attached appliance via the Internet/Intranet, receive sensor information from attached sensors, or accomplish a number of different tasks.

Figure 2:
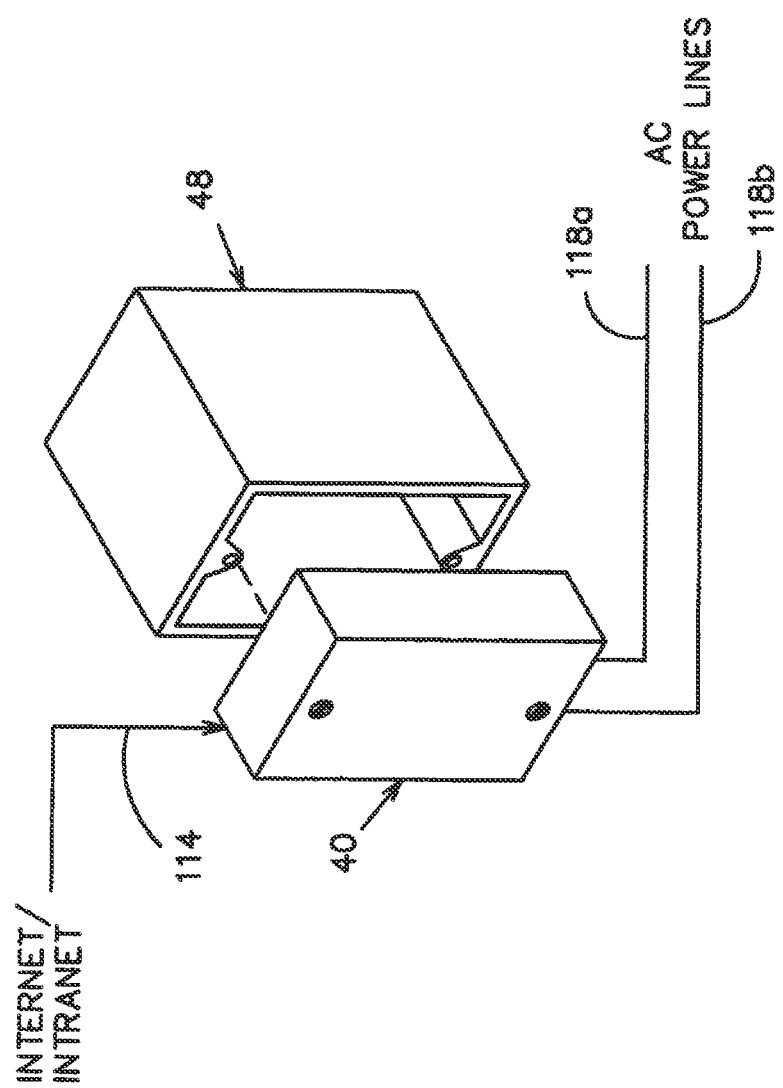
FIG. 2 is a simplified perspective view showing an installation of the AC power circuit of FIG. 1 in the electrical box attached to the AC power lines and the Intranet/Internet.

The AC power circuit 40 is installed in an electrical box 48 as shown in FIG. 2. The AC power is provided via lines 118*a* and 118*b*. The communication connection 114 to the Internet/Intranet can be wired or wireless as shown in FIGS. 3 and 4.

Figure 3:
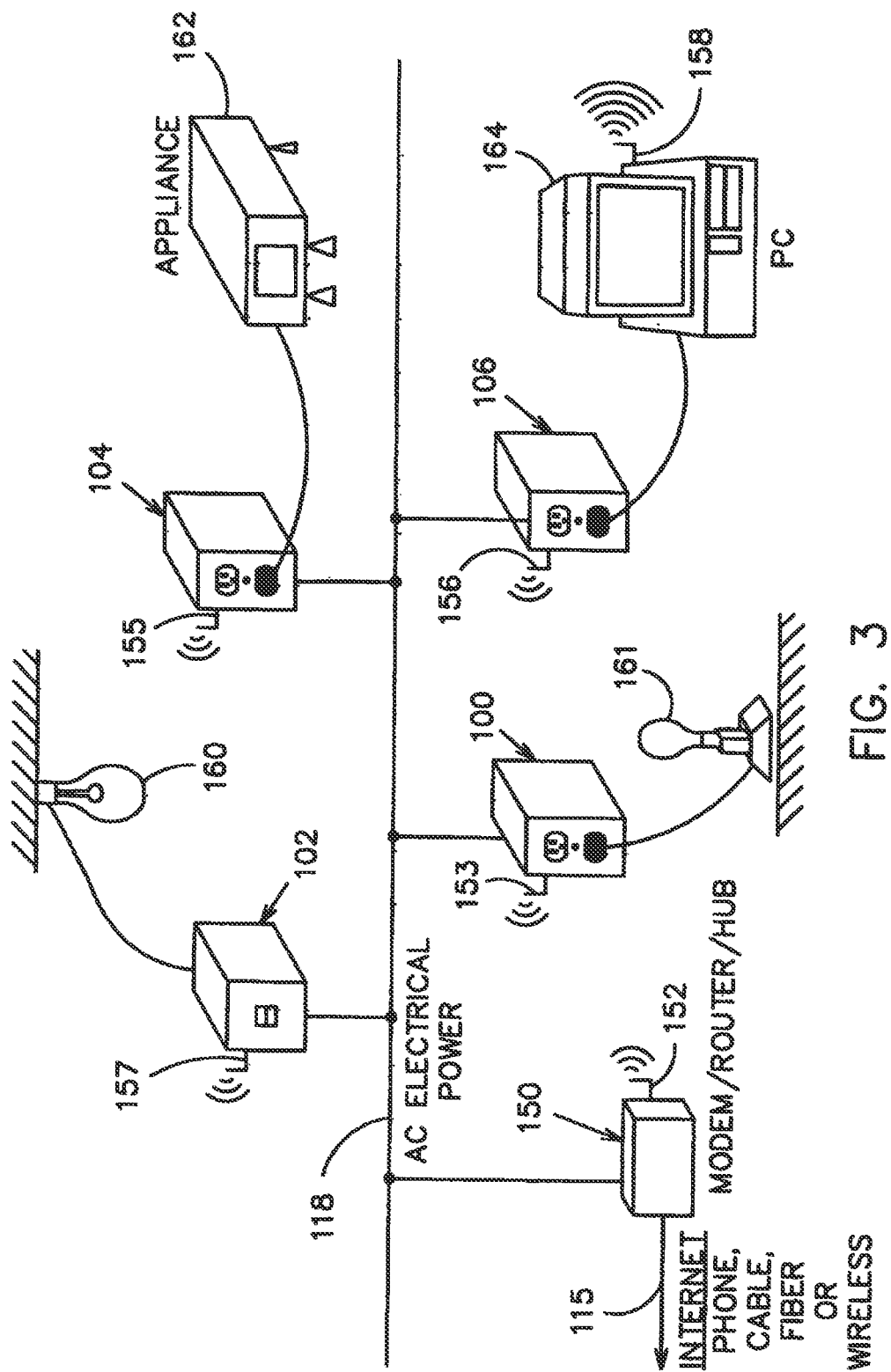
FIG. 3 is an overall diagram of electrical boxes and loads connected wirelessly via the home Intranet and the AC electrical power, according to one embodiment.

FIG. 3 shows a wireless attachment to the Internet via a modem/router/hub 150. The wireless Intranet communication connections are via antennas 152, 153, 155, 156, 157, and 158. Electrical boxes 100, 102, 104, and 106 are connected via the AC electrical wires 118. The electrical boxes 100, 102, 104, and 106 contain the AC power circuit 40, which can control the lights 160, 161, and any attached appliances such as a TV 162 or a Personal Computer 164. Each AC power circuit 40 can be controlled via local control such as a switch, or the PC 164 via the home Intranet, or by remote control via the Internet connection 115. The wireless communication can be HomeRF™, IEEE 802.11, Bluetooth™, or any other wireless Internet technology.

Figure 4:
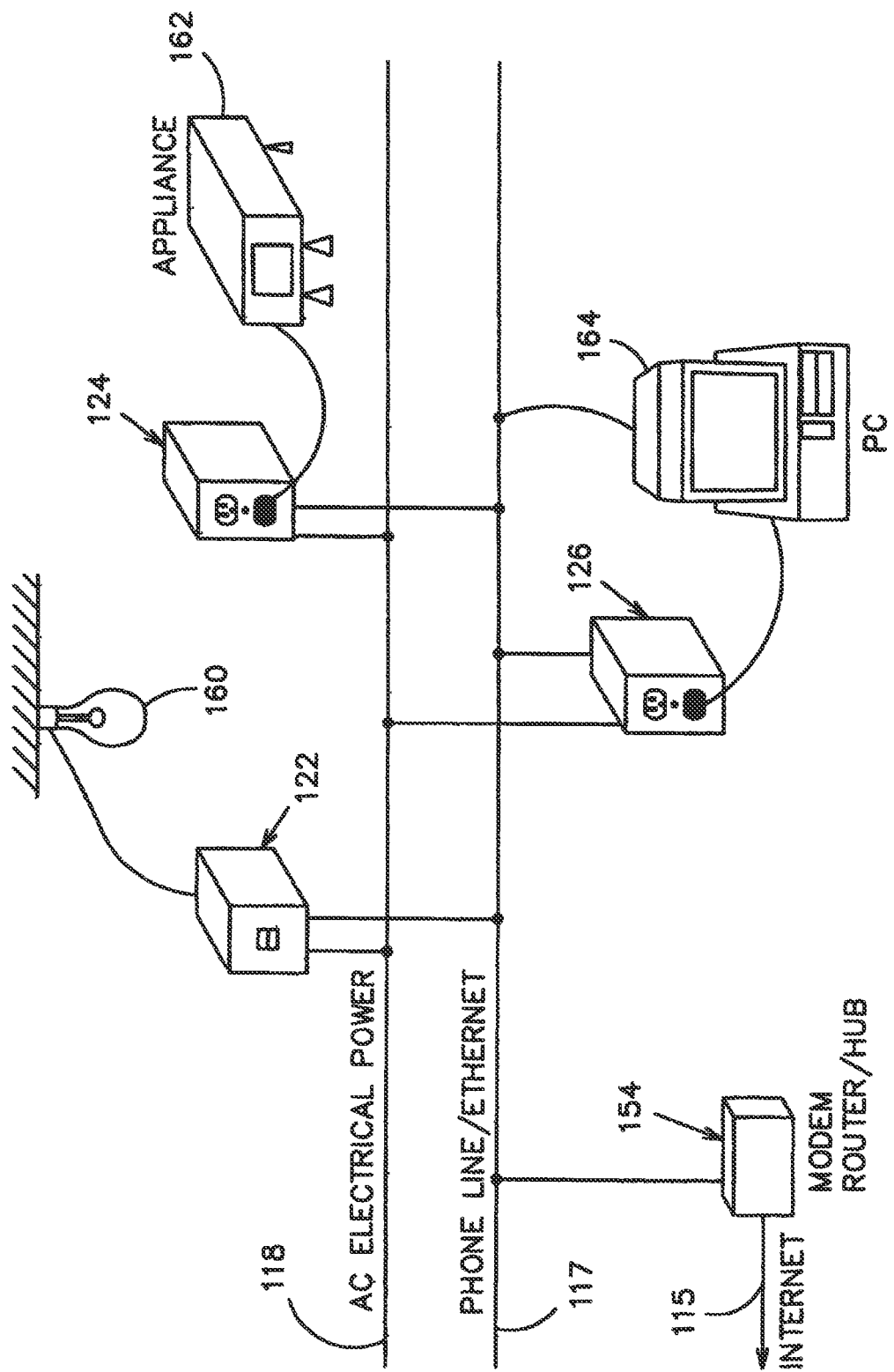
FIG. 4 is an overall diagram of electrical boxes and loads connected with the AC electrical power and the wired home Intranet.

FIG. 4 shows a wired attachment to the Internet via a modem/router/hub 154. The wired Intranet communication connection 117 may be via phone lines, fiber, coax, or Ethernet cable. The electrical boxes 122, 124, and 126 contain the AC power circuit 40, which can control the light 160, and any attached appliances such as a TV 162 or PC 164 via local control such as a switch or local intranet PC 164 or by remote control via the Internet connection 115. The wired communication technology can be Ethernet, HomePNA™ (HomePNA Working Group) or any other wired Internet/Intranet technology. Also, the wired attachment to the Intranet can use the same wires as the electrical power. This communication technology is known as powerline communication.

Figure 5:
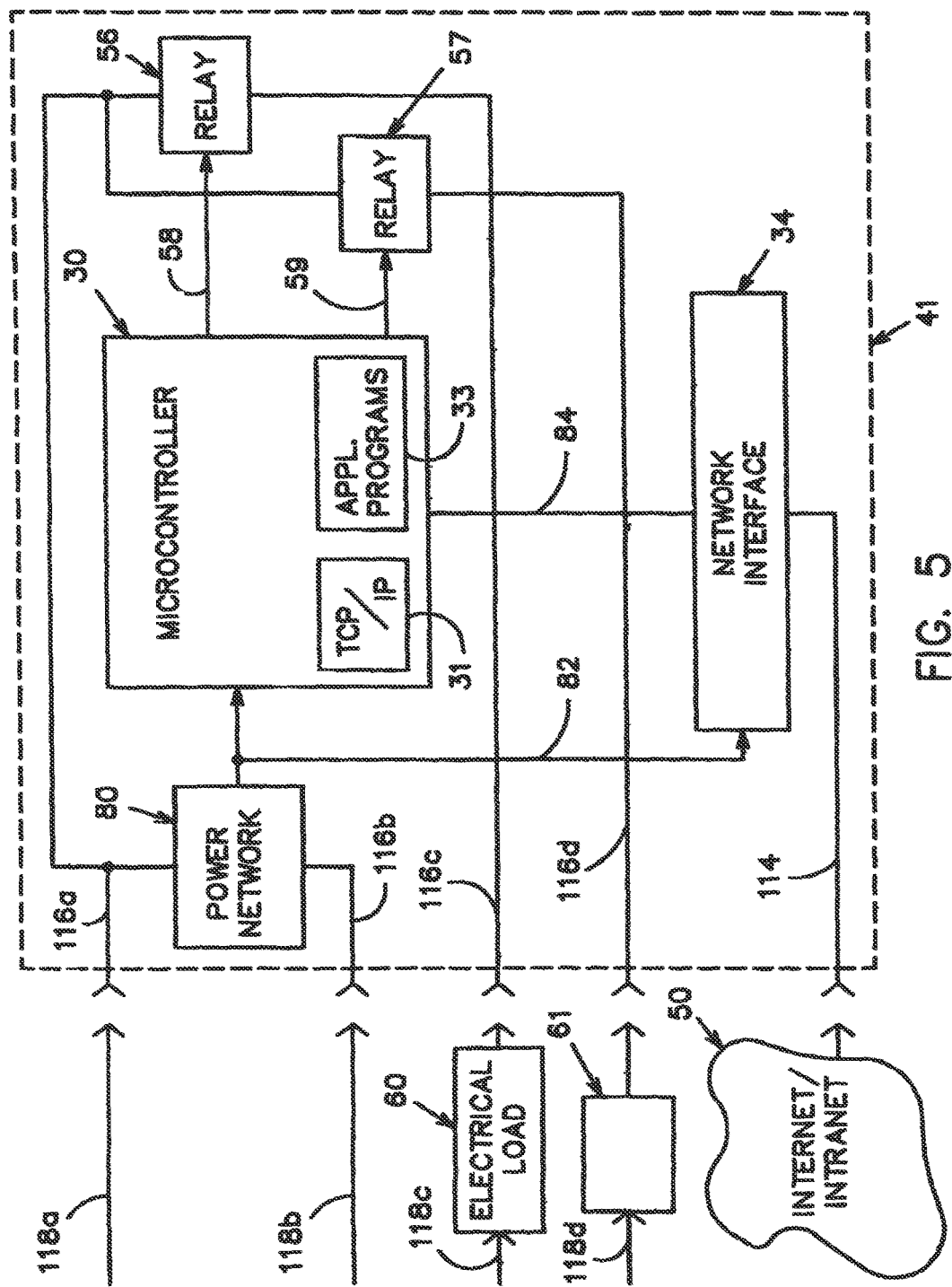
FIG. 5 is a block diagram of the AC power circuit controlling electrical loads.

FIG. 5 is a block diagram schematic of an AC power circuit 41 in which AC power from AC source 118*a*, 118*b*, 118*c*, and 118*d* is applied to the AC power circuit 41 and electrical loads 60 and 61. The AC power circuit 41 is connected to the Internet/Intranet 50 via a communication connection 114. In addition to the power network 80, the controls relays 56 and 57, which supply AC power to an electrical load 60 via a line 116*c* and to an electrical load 61 via a line 116*d*. In this embodiment, the AC power circuit 41 can control the electrical loads 60 and 61 by the Internet/Intranet 50. The AC power circuit 41 could be incorporated in an electrical box that uses parallel connections to the AC power source lines 118*a* and 118*b* which connects to lines 116*a* and 116*b*, respectively, of the AC power circuit 41. Typical applications for the AC power circuit 41 are a switch box with both power lines available or an electrical outlet box.

Figure 6:
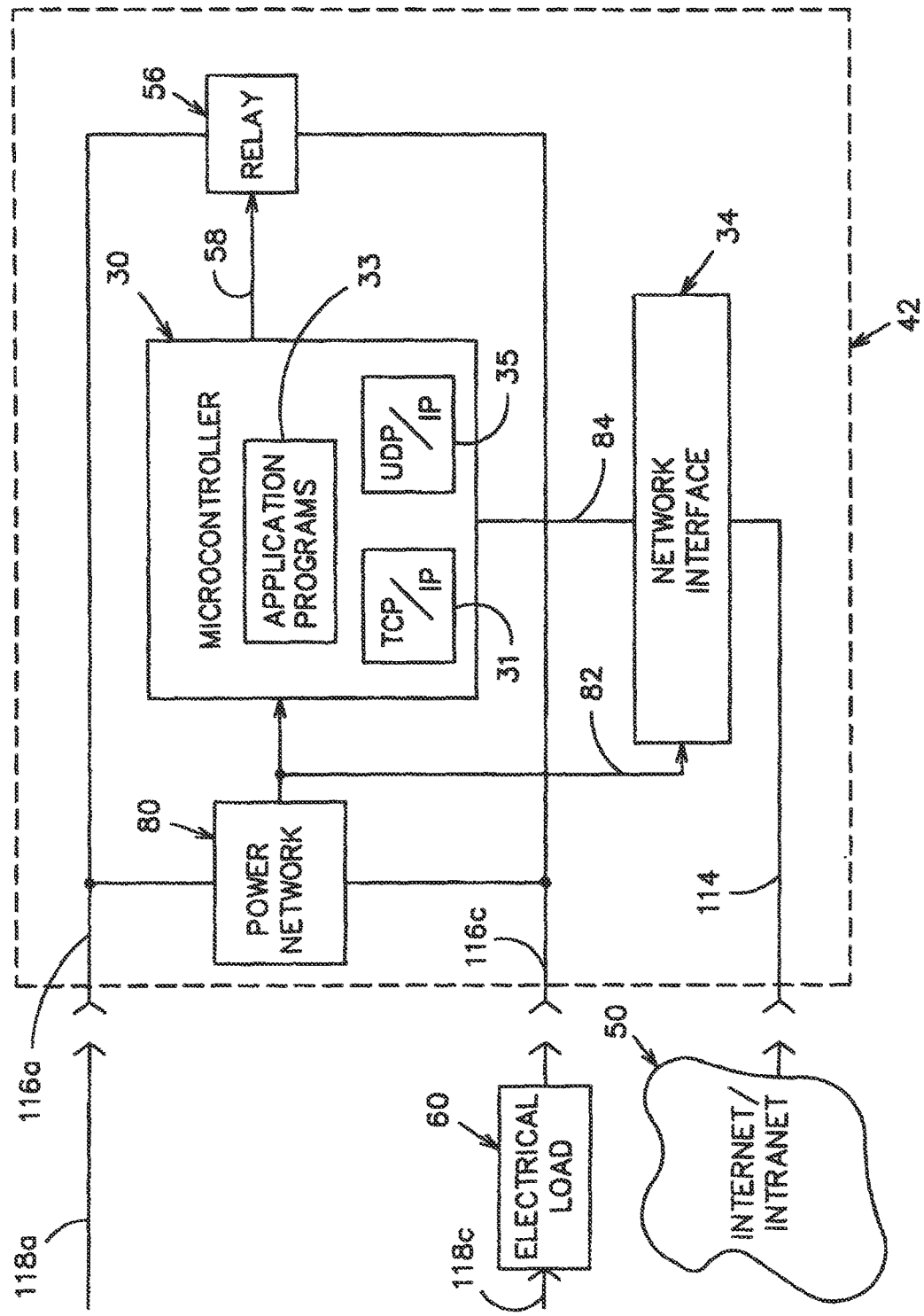
FIG. 6 is a block diagram of the AC power circuit controlling an electrical load in a series AC configuration.

FIG. 6 is a block diagram schematic of an AC power circuit 42 in which AC power from AC source 118*a* and 118*c* is applied to the AC power circuit 42 and the electrical load 60. The AC power circuit 42 is connected to the Internet/Intranet 50 via communication connection 114. The AC power circuit 42 contains the power network 80, the microcontroller 30, the network interface 34, and the relay 56. The AC power circuit 42 is attached to the AC power lines 118*a* and 118*c* in series with the electrical load 60 via line 116*c*. Typical applications for the AC power circuit 42 are in switch boxes that only have series connections to the electrical load. This is common in older homes.

Figure 7:
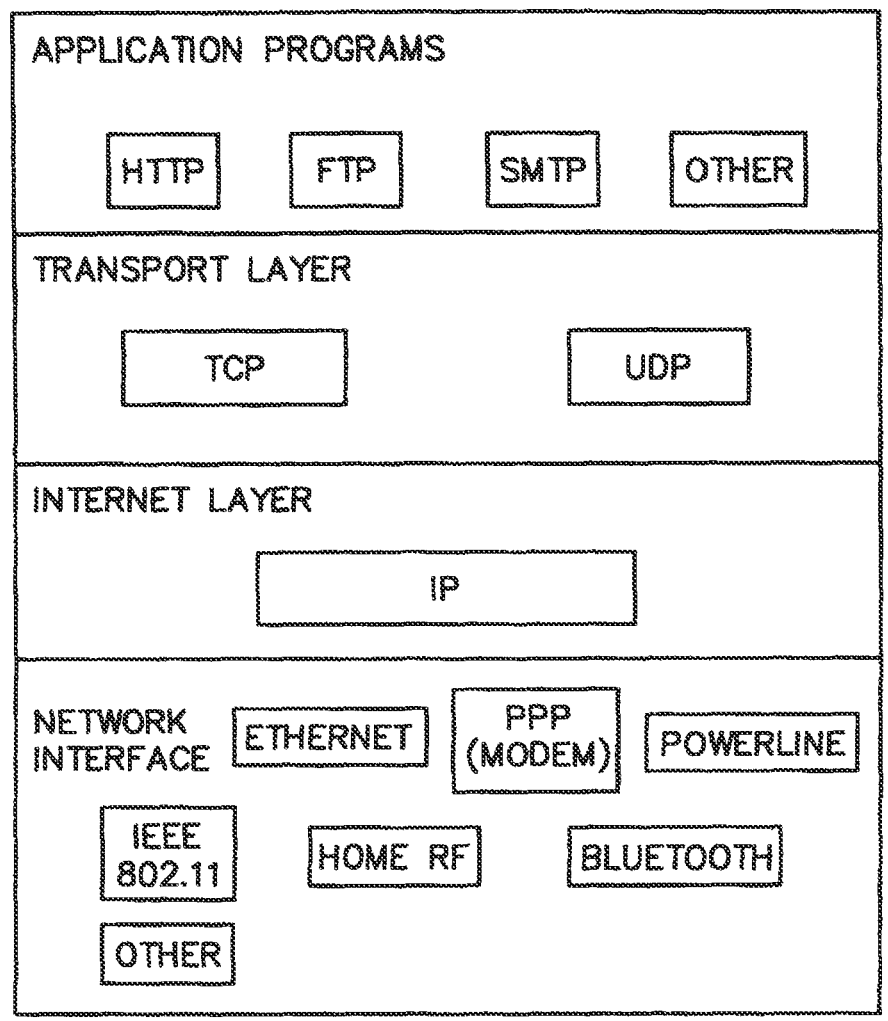
FIG. 7 is a diagram of the Internet Stack using UDP and TCP as the transport protocols, the IP as the network protocol, and illustrating the data link layer protocol such as Ethernet, PPP, and the application layer such as HTTP server, or SMTP e-mail.

The microcontroller 30 in the AC power circuits 40, 41, and 42 has the Internet stack (TCP/UDP/IP) 31 and application programs 33. FIG. 7 shows the software layers that illustrate the Internet stack 31 and application programs 33 contained in the microcontroller 30. FIG. 7 also shows the network interface and some possible communication protocols such as Ethernet, PPP (phone line), powerline, IEEE 802.11, HomeRF™, and Bluetooth™. The microcontroller 30 can contain one or more possible applications such as Hyper-Text Transfer Protocol (HTTP) server, File Transport Protocol (FTP) capability, Simple Mail Transport Protocol (SMTP) capability, and others. The microcontroller 30 can contain the TCP/IP stack or UDP/IP stack, or a combination depending on the application program as illustrated in FIG. 7.

Figure 8:
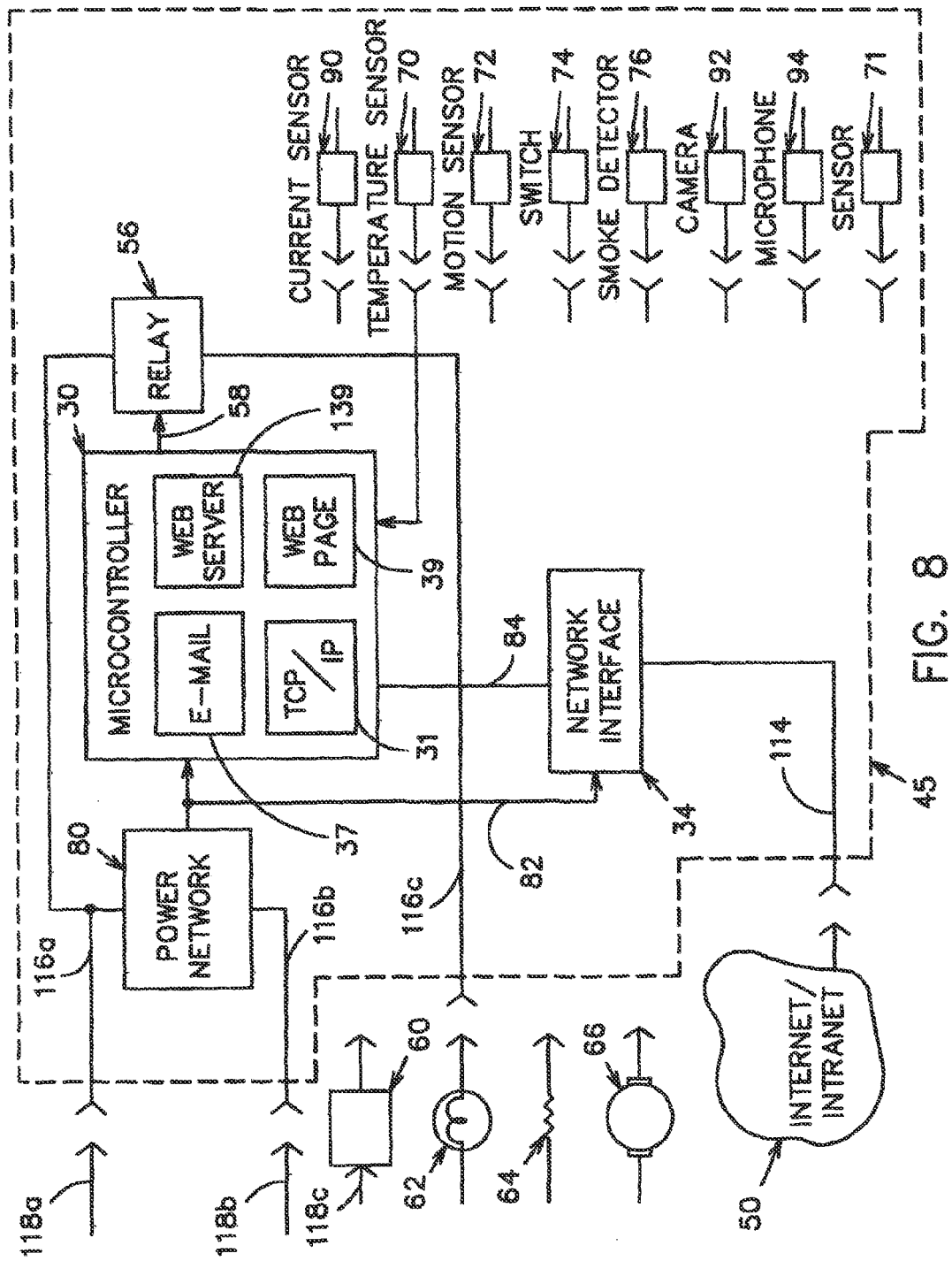
FIG. 8 is a block diagram of the AC power circuit showing some possible application programs run on the microcontroller that control some electrical loads and/or receive information from sensors.

FIG. 8 shows a block diagram schematic of the possible configurations to an AC power circuit 45. The AC power circuit 45 can control different electrical loads such as a light 62, a heater 64, an electrical motor 66, or any other electrical appliance 60.

The microcontroller 30 that is contained in the AC power circuit 45 can run an e-mail application program 37 that sends out information upon some condition. For example, if the motion sensor 72 detects some movement in an area, or if the smoke detector 76 indicates a fire, an e-mail can be sent to alert the proper agency for assistance.

The microcontroller 30 can run a web server application 139 with a web page 39. The web server application 139 receives HTTP commands through the network interface 34 that specifies a predetermined Internet Protocol (IP) number for the AC power circuit 45. Web clients to read information from the AC power circuit 45, such as the status of the AC power to the electrical load, may use the HTTP commands. HTTP commands may also be used to transfer information to the AC power circuit 45 such as information that controls the electrical load or sensors.

In response to an HTTP request, the AC power circuit web server application 139 generates a web page 39 that specifies interactions to the attached electrical load and sensors. The web page 39 is a Hypertext Markup Language (HTML) formatted page or an eXtensive Markup Language (XML) formatted page. The network interface 34 transfers the web page 39 to the web client that requested the information via the Internet/Intranet 50.

FIG. 8 also shows various connected sensors to the microcontroller 30 such as a current sensor 90 for monitoring the electrical power used by the electrical load, a temperature sensor 70 for indicating the indoor or outdoor temperature of a room, a motion sensor 72 to detect movement within the room, a switch 74 for locally activating the AC power to the load, a smoke detector 76 to detect the presence of a fire, a camera 92 to provide observations in the room, a microphone 94 to monitor the audio within the room, and many other types of sensors 71. The microcontroller 30 can be programmed to communicate to other AC power circuits in other electrical boxes to allow multiple actions to occur upon a sensor detecting a condition. For example, the microcontroller 30 can be programmed to detect movement within the room by the motion sensor 72 in one electrical box to activate lights in other electrical boxes within the house via the home Intranet. In addition, the microcontroller 30 can be programmed to send an e-mail to the owner or monitoring company that someone is present in the home.

Figure 9:
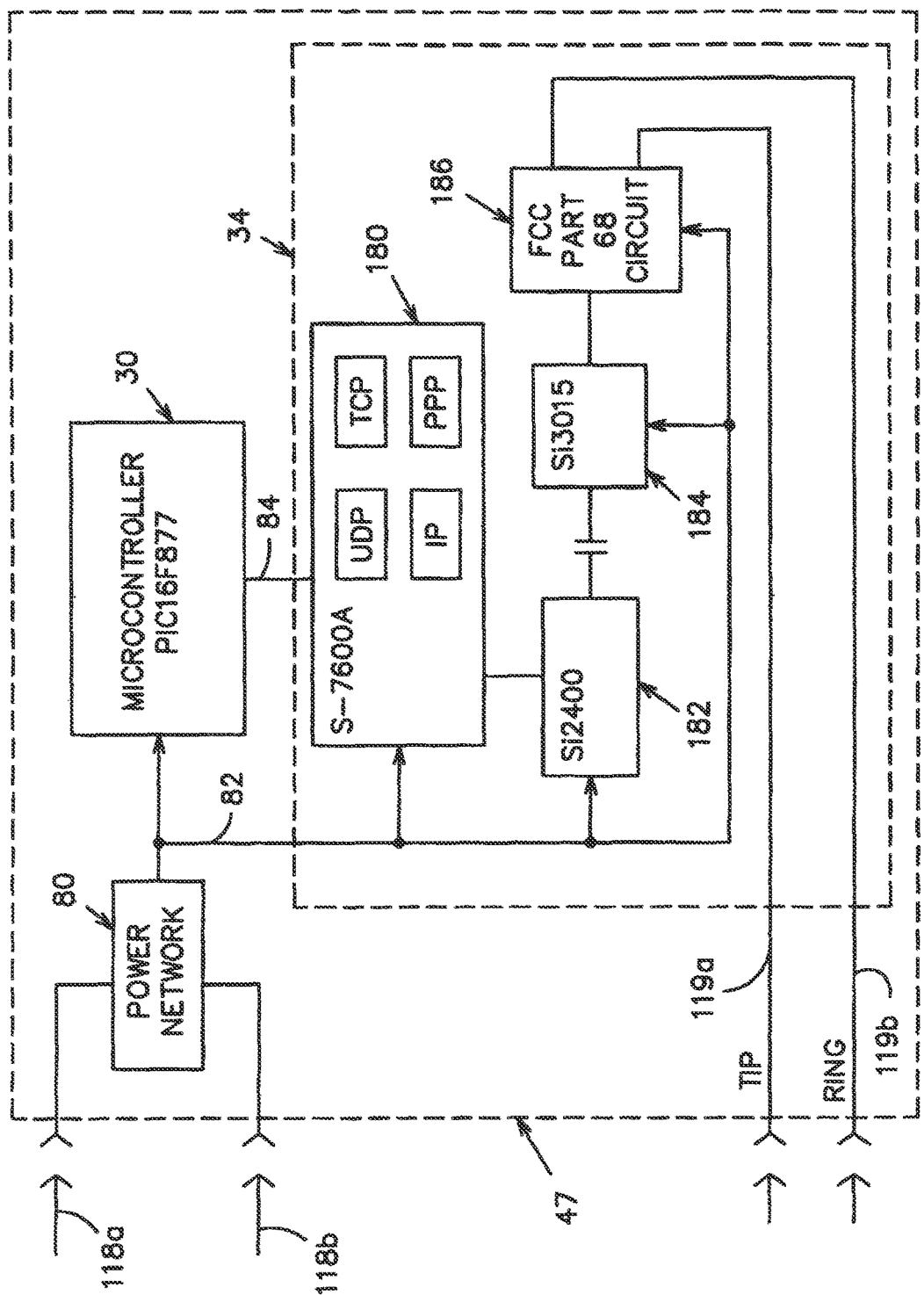
FIG. 9 is a block diagram of the AC power circuit showing that the TCP/IP stack in the network interface block and attached to the home Intranet via phone lines.

In another embodiment, the network interface 34 contains the TCP/IP and UDP/IP stacks instead of the microcontroller 30. FIG. 9 shows an embodiment of an AC power circuit 47 with TCP/IP contained in the network interface 34. This embodiment uses a commercially available integrated chip 180 that is denoted as S-7600A made by Seiko Instruments, Inc. The power network 80 provides the necessary low voltage power for supplying the various integrated circuits. In this embodiment, the AC power circuit 47 is attached to the home Intranet via phone lines 119*a* and 119*b*. The Internet modem chipset 182 and 184 that communicates between the integrated chip 180 to the phone lines are from Silicon Laboratories, and are demoted as Si2400 and Si3015. The modem chipset 182 and 184 provide connect rates of up to 2400 bps, full duplex over the telephone lines 119*a* and 119*b*. Other modem chipsets can provide higher data rates. Block 186 provides the necessary circuits to interface to the phone lines according to FCC part 68 specifications.

Figure 10:
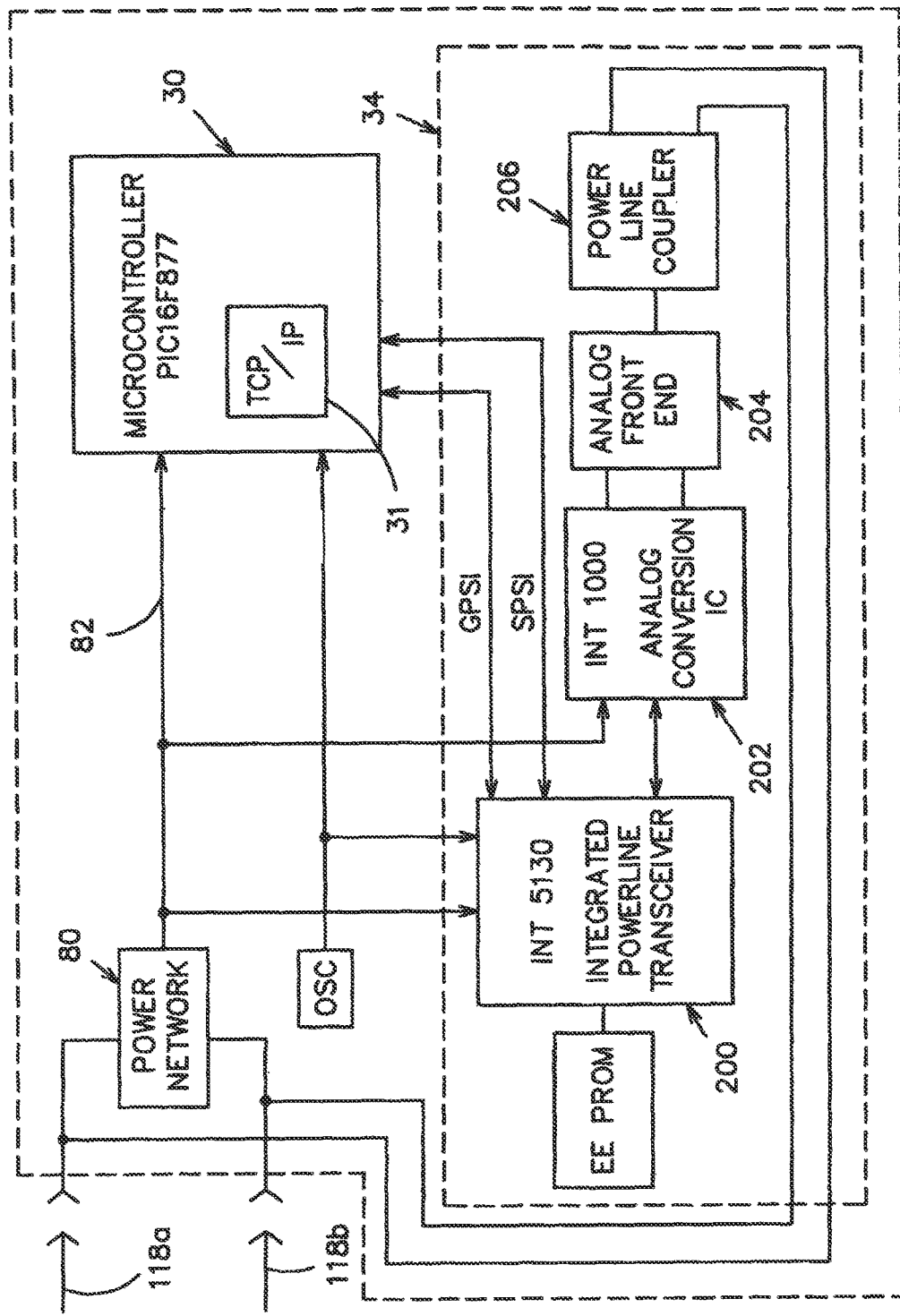
FIG. 10 is a block diagram of the AC power circuit connected to the home Intranet via power lines.

In another embodiment, the network interface 34 is connected to the home Intranet via the power lines. FIG. 10 shows this embodiment where an AC power circuit 49 connects to the home Intranet via electrical power lines 118*a* and 118*b*. The network interface 34 contains powerline chipset 200 and 202 from Intellon and is denoted as INT 5130, an integrated powerline transceiver, and INT1000, an analog conversion integrated circuit. The powerline chipset 200 and 202 are connected to the electrical power lines 118*a* and 118*b* via an analog front end 204 and a power line coupler 206. The Internet stack is in the microcontroller 30. The microcontroller 30 in FIG. 10 is a Microchip PIC16F877.

Figure 11:
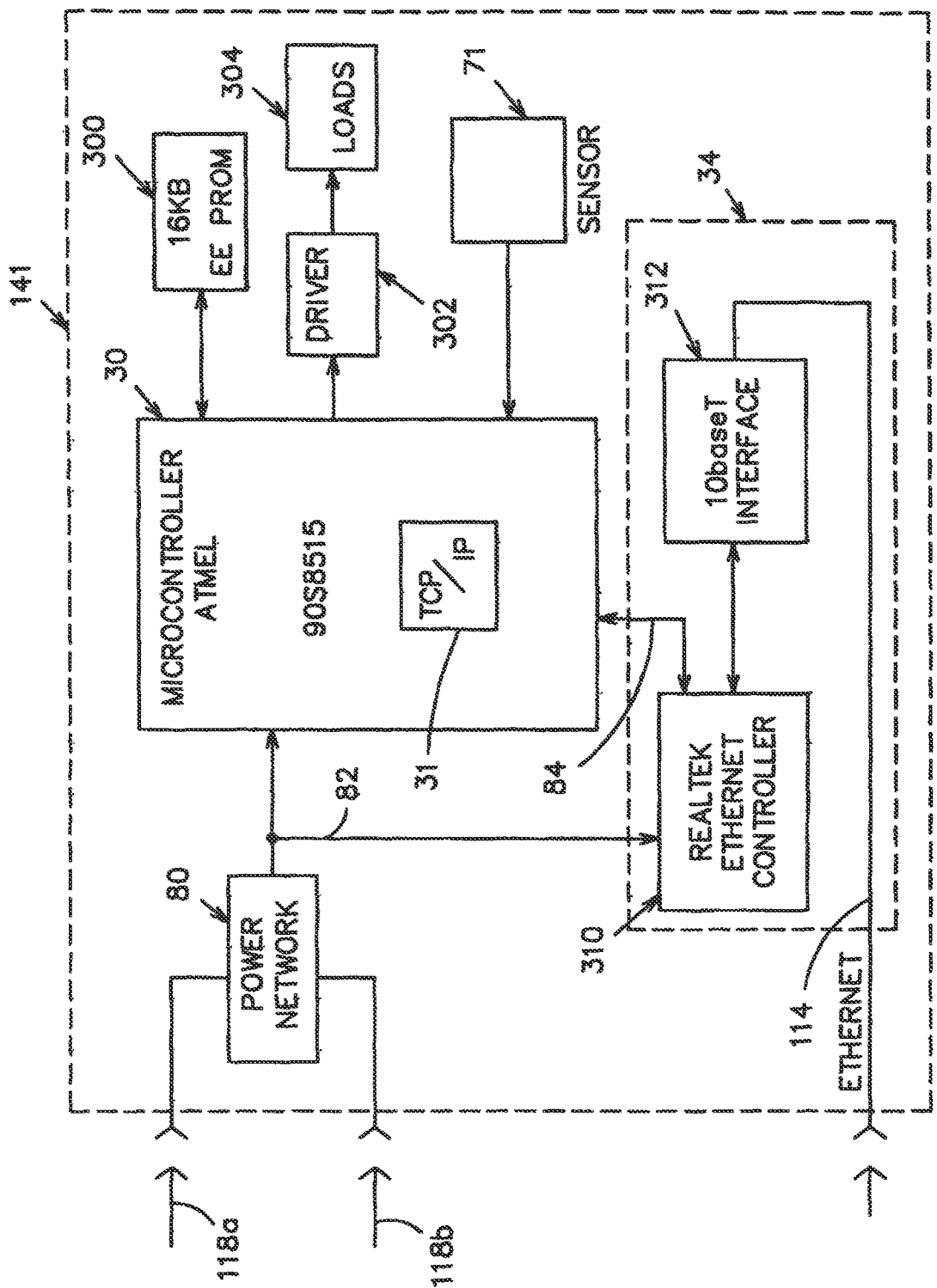
FIG. 11 is a block diagram of the AC power circuit connected to the home Intranet using a wired Ethernet connection.

FIG. 11 shows another embodiment where an AC power circuit 141 is connected to the home Intranet via an Ethernet cable 114. In this embodiment, the microcontroller 30 is an Atmel 908815 and has memory 300 that is external to the microcontroller 30 for storing a web page. In addition, the microcontroller 30 controls loads 304 via a driver 302. Sensors 71 are connected in this embodiment. The network interface 34 uses a Realtek Ethernet Controller 310 and interfaces to the home Intranet cable using 10baseT Interface 312.

Figure 12:
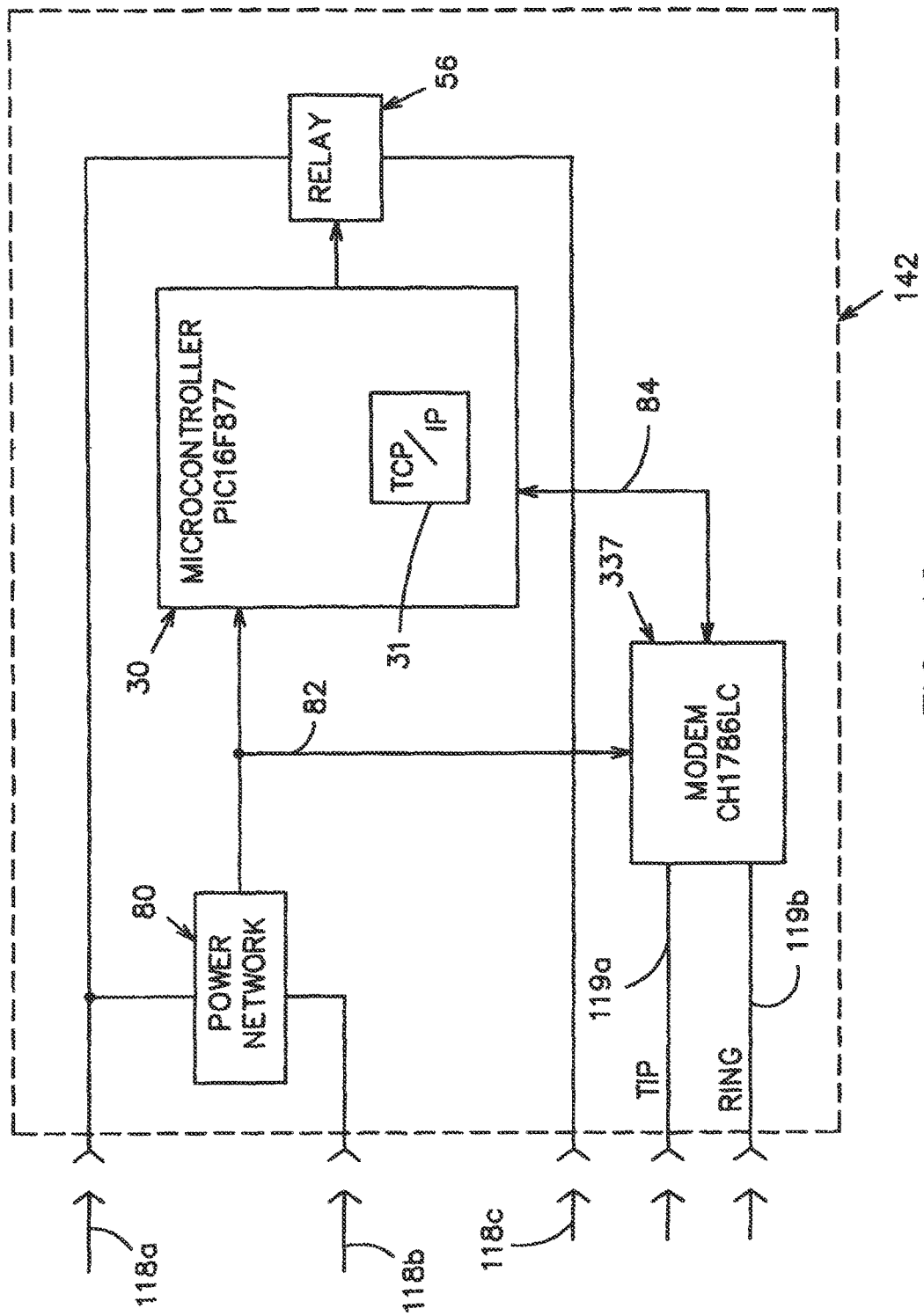
FIG. 12 is a block diagram of the AC power circuit connected to phone lines and controlling an electrical load.

FIG. 12 shows another embodiment where the AC power circuit 142 is connected to the Intranet via phone lines 119*a* and 119*b* via a modem module 337. The modem module 337 is a Cermetek CH1786LC. The microcontroller 30 is a Microchip PIC16F877 and has software, which implements the TCP/IP stack. In this embodiment, the microcontroller 30 is programmed to control the relay 56 to supply power to an electrical load attached to line 118c. A web client or device attached to the Intranet/Internet can control the relay 56 via the Intranet/Internet.

Figure 13:
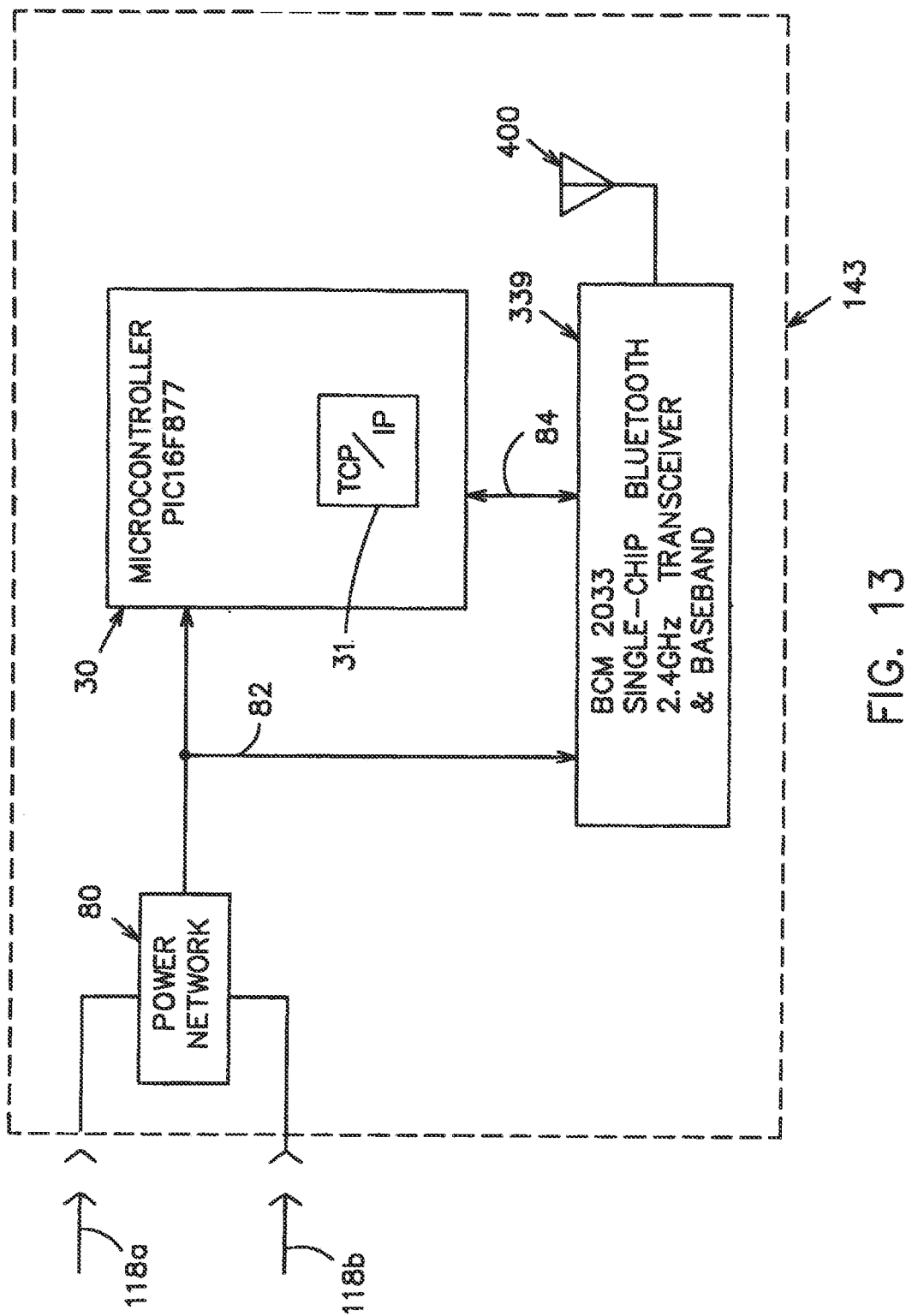
FIG. 13 is a block diagram of the AC power circuit connected wirelessly to the home Intranet using Bluetooth™.

FIG. 13 shows another embodiment where an AC power circuit 143 is connected to the home Intranet via a wireless connection 400. A single-chip Bluetooth™ transceiver 339 is the network interface connection to the home Intranet. The transceiver 339 in this embodiment is a Broadcom BCM2033 and provides short-range communication with PCs, laptops, PDAs, peripheral devices, and embedded devices.

Figure 14:
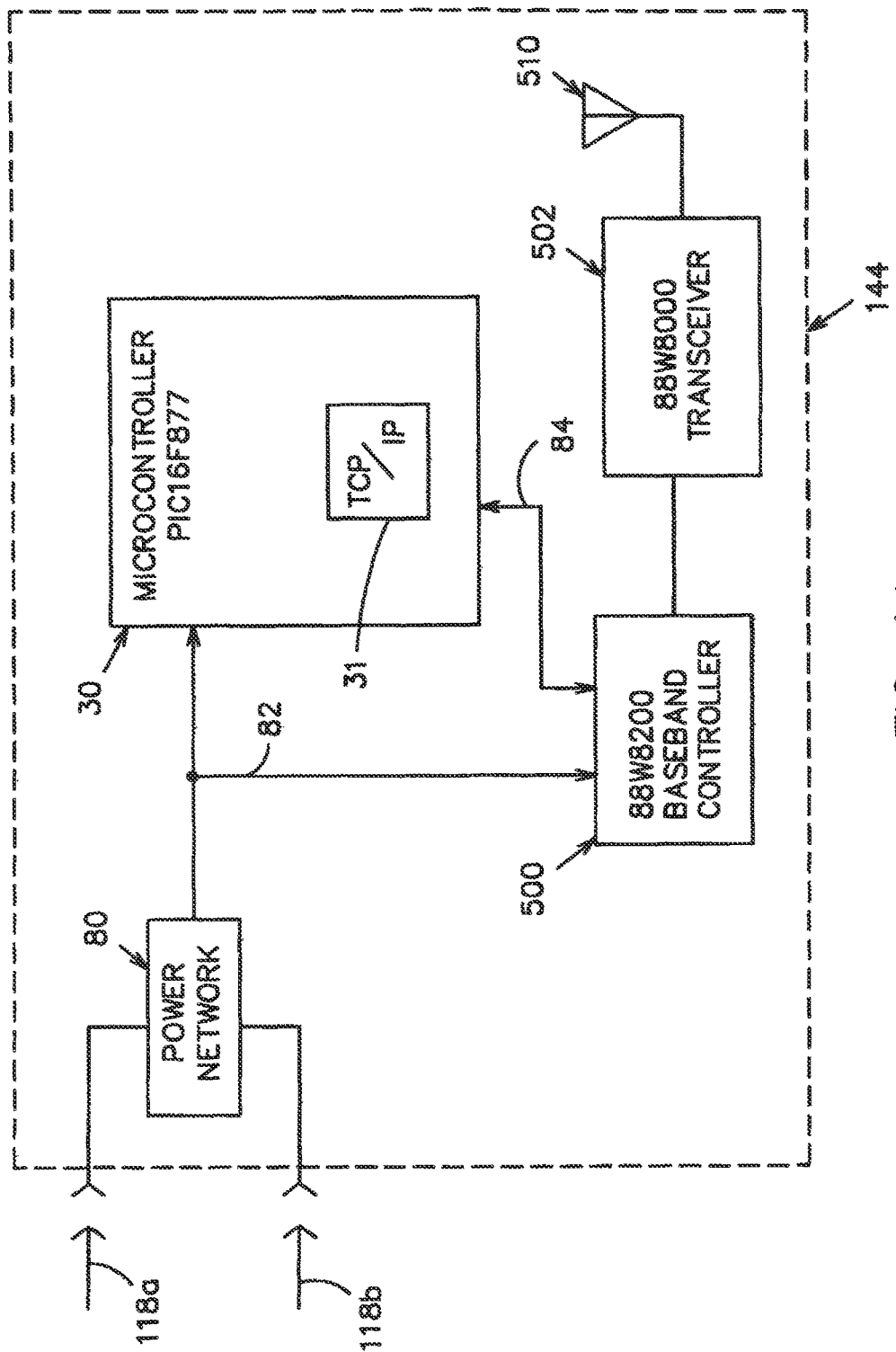
FIG. 14 is a block diagram of the AC power circuit connected wirelessly to the home Intranet using wireless Ethernet, IEEE 802.11.

FIG. 14 shows another embodiment where an AC power circuit 144 is connected to the home Intranet via a wireless connection 510. The wireless chipset 500 and 502 uses a Marvell 88W8200 baseband controller and Marvell 88W8000 transceiver to form an IEEE 802.11 wireless connection.

Figure 15:
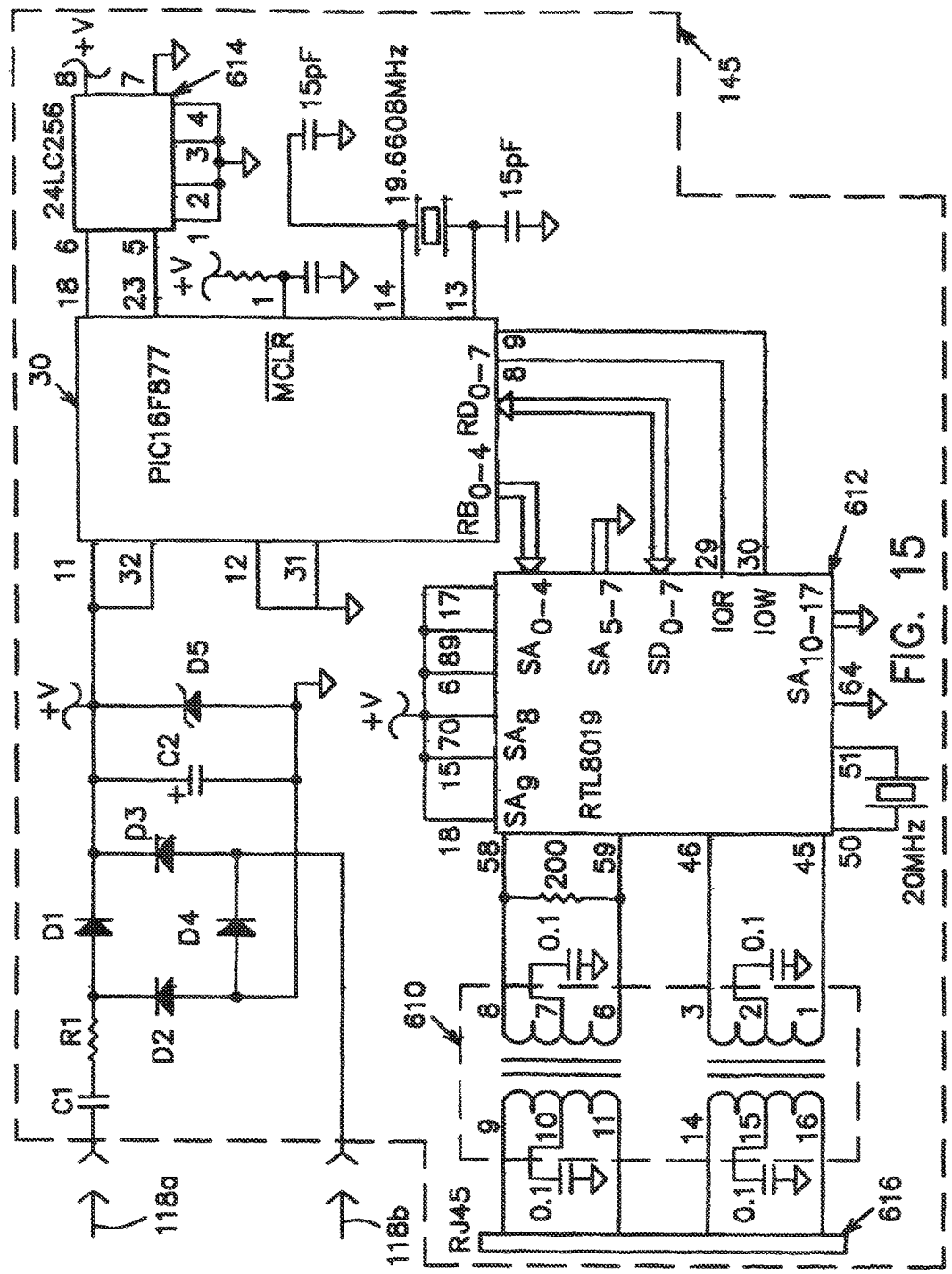
FIG. 15 is a schematic of one implementation of the AC power circuit that is connected to the home Intranet via a wired Ethernet connection.

FIG. 15 shows another embodiment where an AC power circuit 145 is connected to the home Intranet via a wired Ethernet connection 616. FIG. 15 is a schematic of the circuitry that implements this embodiment. The AC power lines 118a and 118b provide electrical power to the circuit. A capacitor C1 drops the high voltage AC to low voltage AC. Diodes D1-D4 convert the AC power to DC power. A capacitor C2 acts as a filter capacitor, and a diode D5 limits the DC supply. The microcontroller 30 interfaces with an EEPROM 614 and an Ethernet Controller IC 612. As show in FIG. 15, the microcontroller 30 in this schematic is a Microchip PIC16F877 and the Ethernet controller 612 is a Realtek RTL8019. The microcontroller 30 is programmed to act as a web server with the web page stored in the EEPROM 614. The microcontroller 30 communicates to the home Intranet and the Internet through the wired Ethernet connection 616. A coil 610 isolates the home wired Intranet from the Ethernet controller 612. In this embodiment, the AC power circuit 145 acts a web server.

Figure 16:
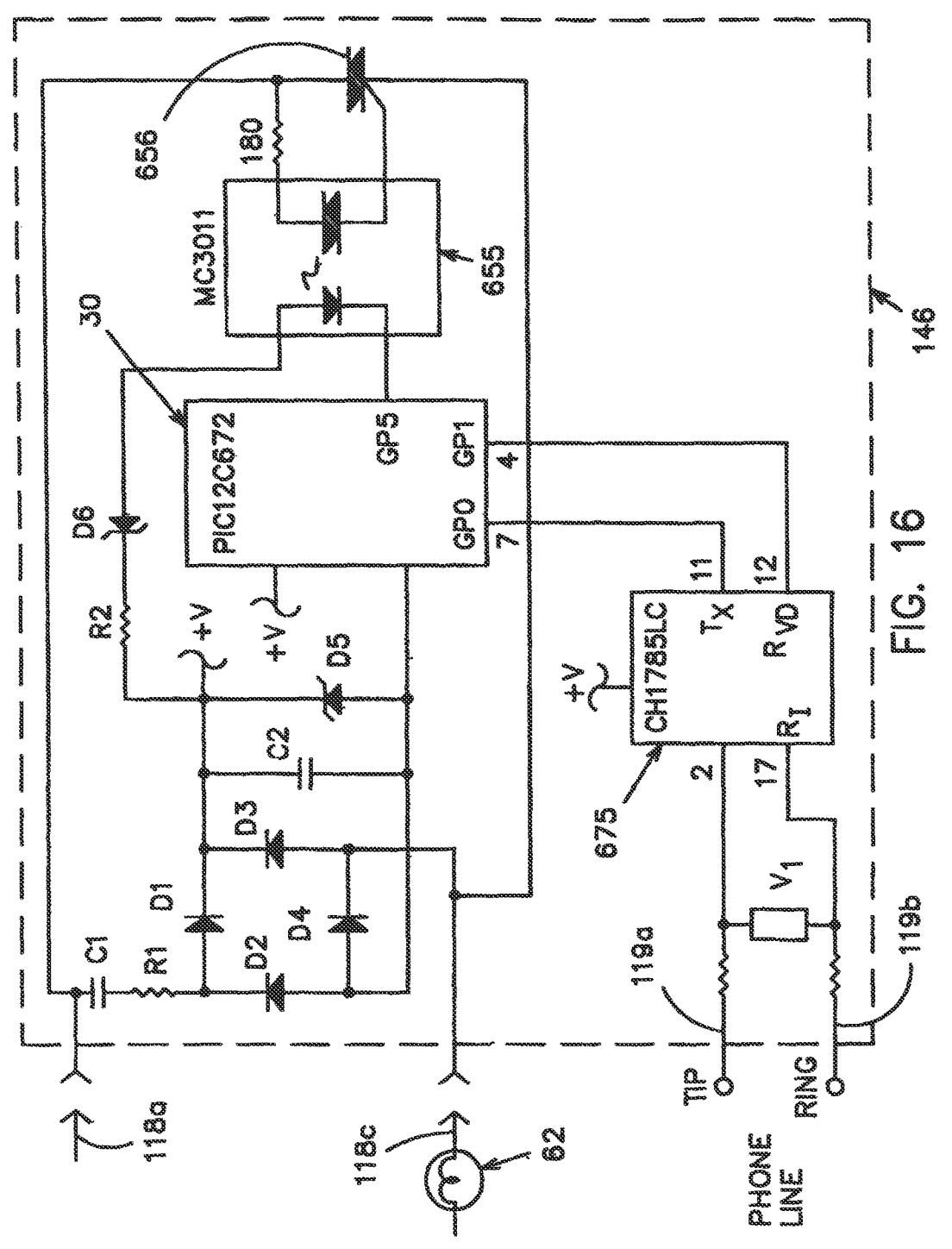

FIG. 16 shows another embodiment where an AC power circuit 146 is connected to the home Intranet via wired phone line connections 119a and 119b. FIG. 16 is a schematic of the circuitry that implements this embodiment. In this embodiment, the AC power circuit 146 controls an electrical load such as a light 62. This is a single wire connection to the electrical load 62. In this embodiment, a power network, which is made up of capacitor C1, resistor R1, diodes D1-D4, capacitor C2, and zener diode D5, supplies low voltage power to the microcontroller 30 and a modem module 675. The power network steals a portion of the AC power for powering the circuitry. A triac 656 controls the power to the electrical load 62 when activated by the microcontroller 30 via a triac driver 655.

Figure 17A:
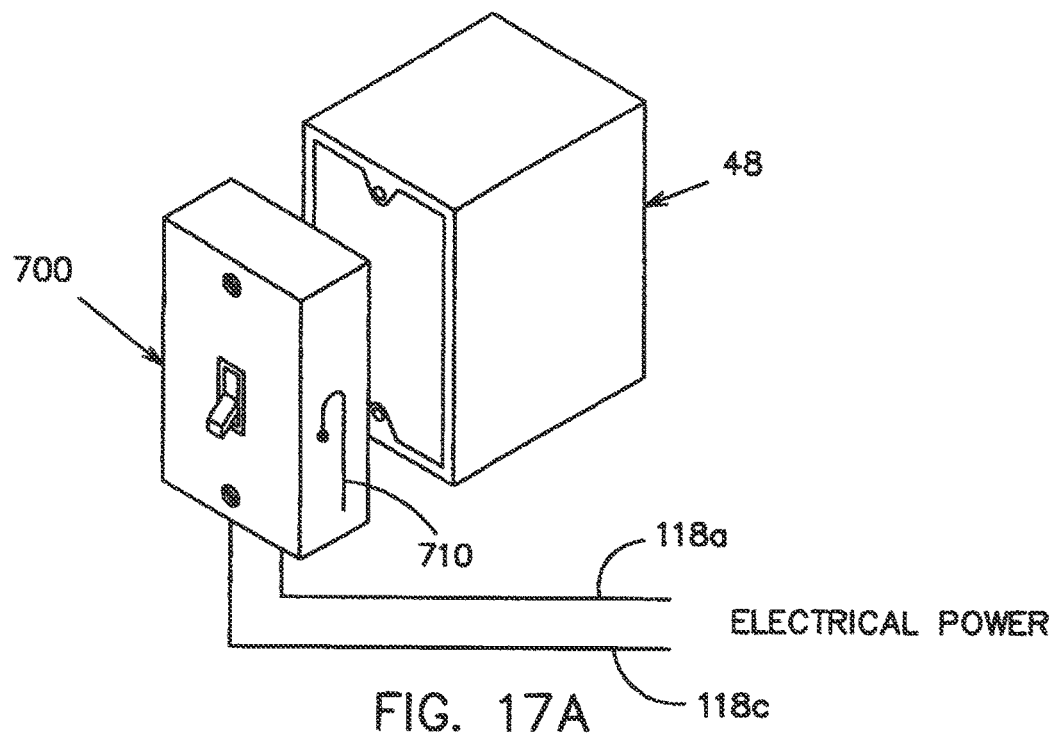
FIG. 17A is an installation of the integrated AC power circuit with an electrical switch within an electrical box with a wireless connection to the home Intranet.
Figure 17B:
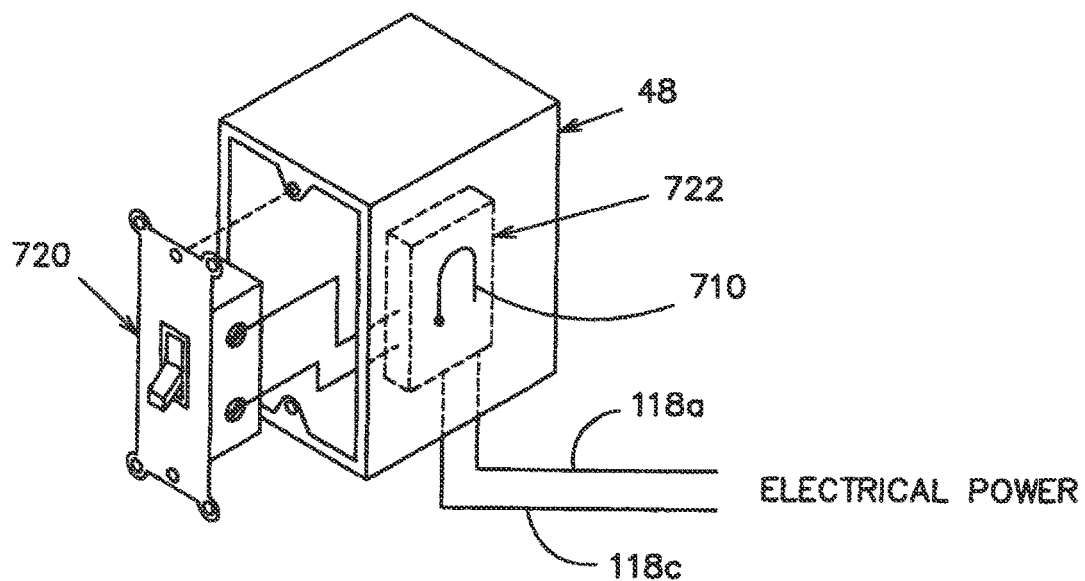
FIG. 17B is an installation of the AC power circuit and an electrical switch within an electrical box with a wireless connection to the home Intranet.

FIGS. 17A and 17B show two alternative installations of an AC power circuit with a electrical switch and both installations use a wireless connection 710 to the home Intranet and are installed in an electrical box 48. In FIG. 17A, the switch is integrated with the AC power circuit and forms a standalone switch module 700. In FIG. 17B, a switch 720 is not integrated in an AC power circuit 722. FIG. 17A shows the installation of the switch module 700 into the electrical box. FIG. 17B shows the installation of the standard electrical switch 720 and the AC power circuit 722 into the electrical box 48. In both cases the AC electrical supply is provided by lines 118a and 118c.

Figure 18A:
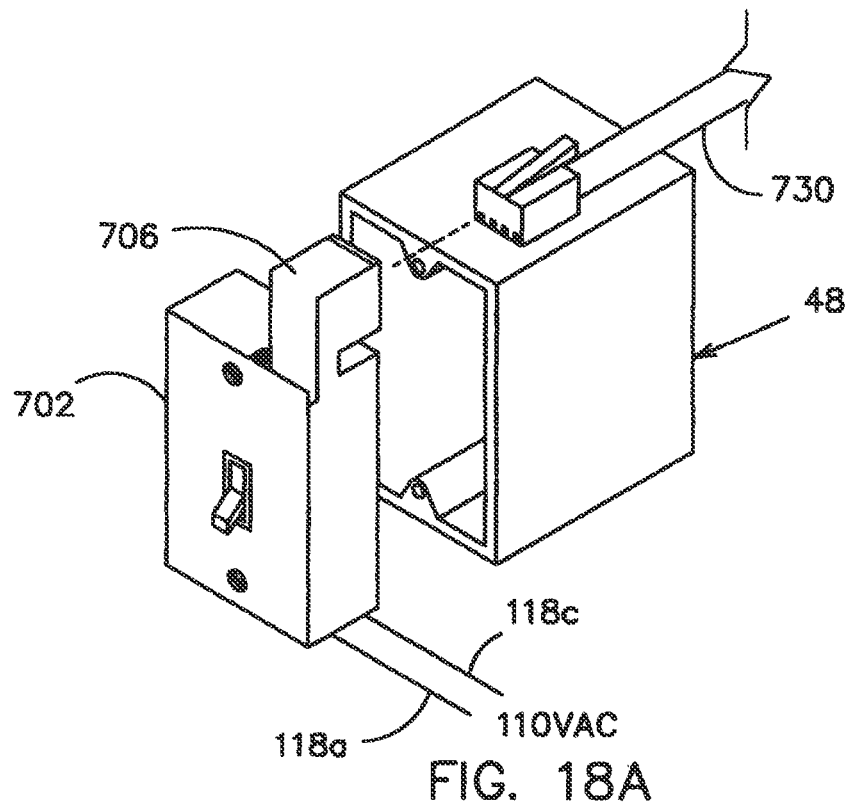
FIG. 18A is an installation of the integrated AC power circuit with an electrical switch within an electrical box with a wired connection to the phone or Ethernet.
Figure 18B:
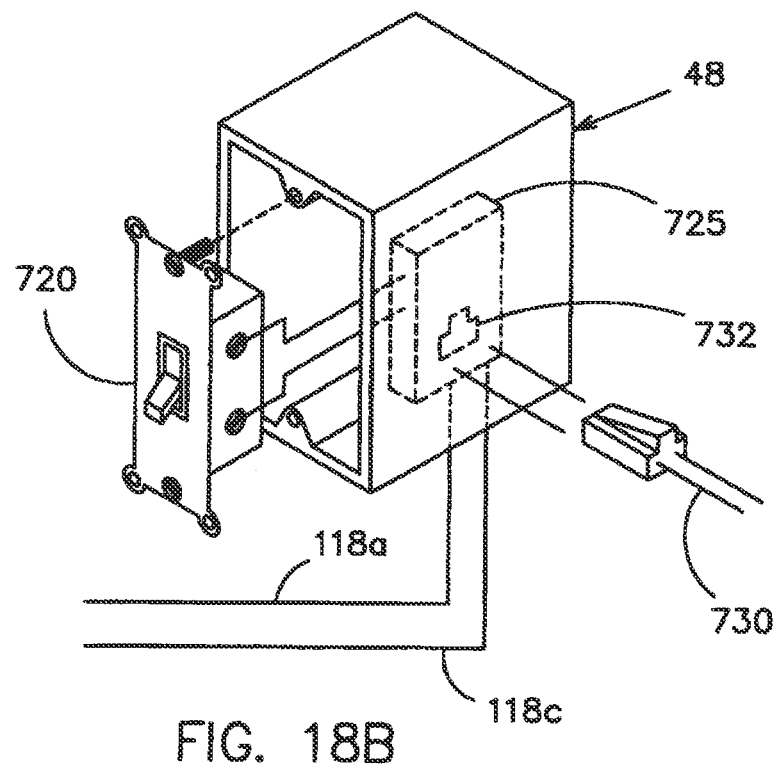
FIG. 18B is an installation of the AC power circuit with an electrical switch within an electrical box with a wired connection to the phone or Ethernet cable.

FIGS. 18A and 18B show two alternative installations of an AC power circuit with an electrical switch and both installations use a wired connection 730 to home Intranet and are installed in the electrical box 48. In FIG. 18A, the switch is integrated with the AC power circuit and forms a standalone switch module 702. In FIG. 18B, a switch 720 is not integrated in an AC power circuit 725. FIG. 18A shows the installation of the switch module 702 into the electrical box 48 and how the switch module 702 attaches to the home Intranet via connector socket 706. The connector socket 706 slides over the electrical box 48. A home Intranet cable 730 connects to the socket 706. FIG. 18B shows the installation of the standard electrical switch 720 and the AC power circuit 725 into the electrical box 48. The home Intranet cable 730 connects to AC power circuit 725 via the socket 732. In both situations, the AC electrical power supply is provided by lines 118a and 118c.

Figure 19A:
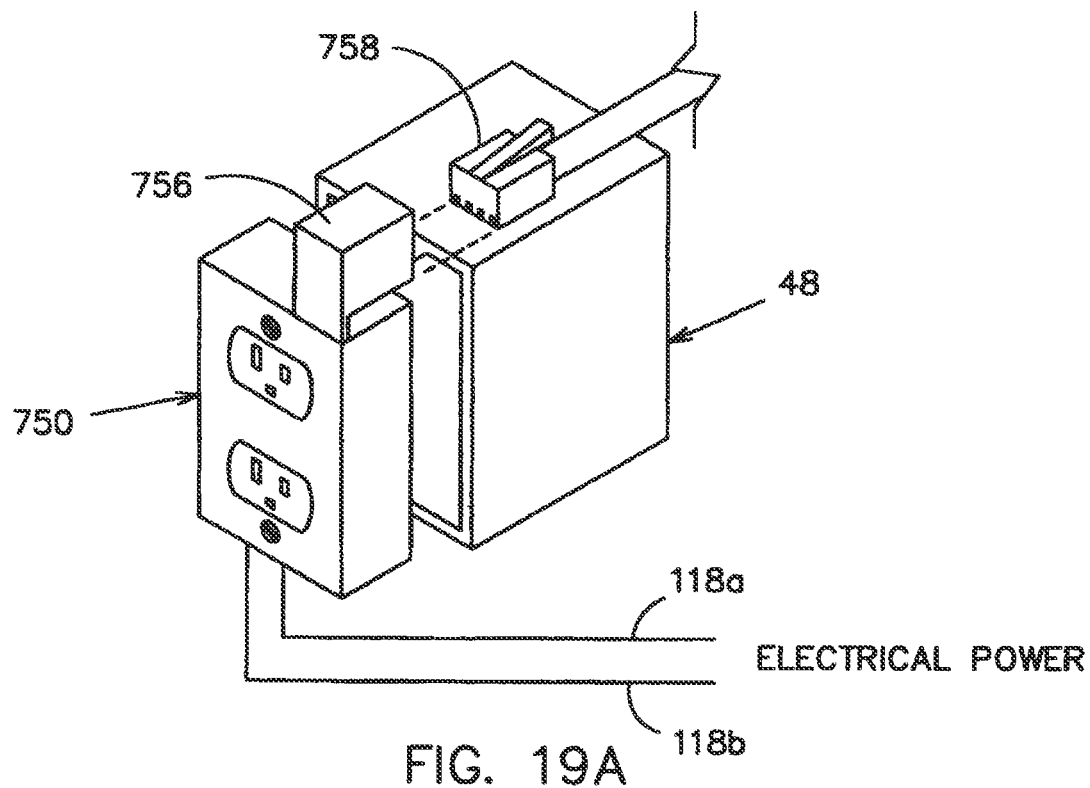
FIG. 19A is an installation of the integrated AC power circuit with an electrical receptacle within an electrical box and is connected with a wired connection to a home Intranet.
Figure 19B:
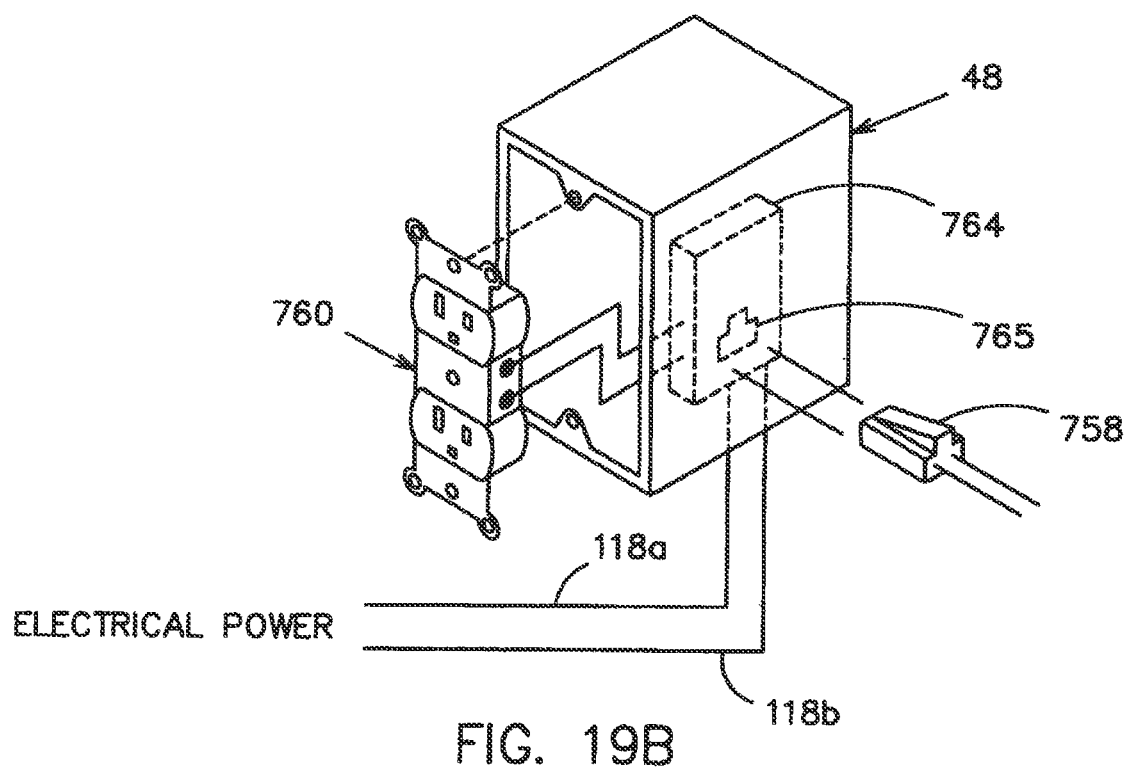
FIG. 19B is an installation of the AC power circuit with an electrical receptacle within an electrical box and is connected with a wired connection to a home Intranet.

FIGS. 19A and 19B show two alternatives installations of an AC power circuit with an electrical receptacle into an electrical box 48. Both installations use wired connection 758 to the home Intranet. In FIG. 19A, the receptacle is integrated with the AC power circuit and forms a standalone receptacle module 750. The connector socket 756 slides over the electrical box 48. The home Intranet cable connects to the socket 756 with a connector 758. FIG. 19B shows a receptacle 760 is not integrated in an AC power circuit 764. FIG. 19B shows the installation of the standard electrical receptacle 760 and the AC power circuit 764 into the electrical box. The connector 758 connects to the AC power circuit 764 via the socket 765. In both schemes, the AC electrical power is provided by lines 118a and 118b.

Figure 20A:
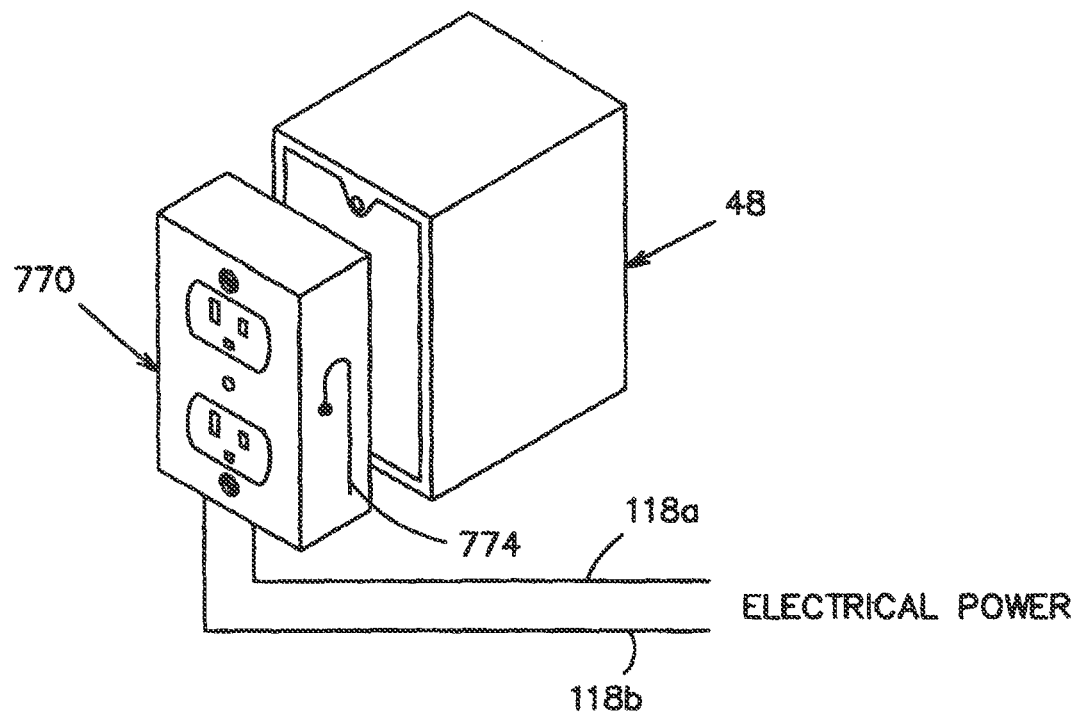
FIG. 20 is an installation of the integrated AC power circuit with an electrical receptacle within an electrical box with a wireless connection to a home Intranet.
FIG. 20B is an installation of the AC power circuit with an electrical receptacle within an electrical box with a wireless connection to a home Intranet.
Figure 20B:
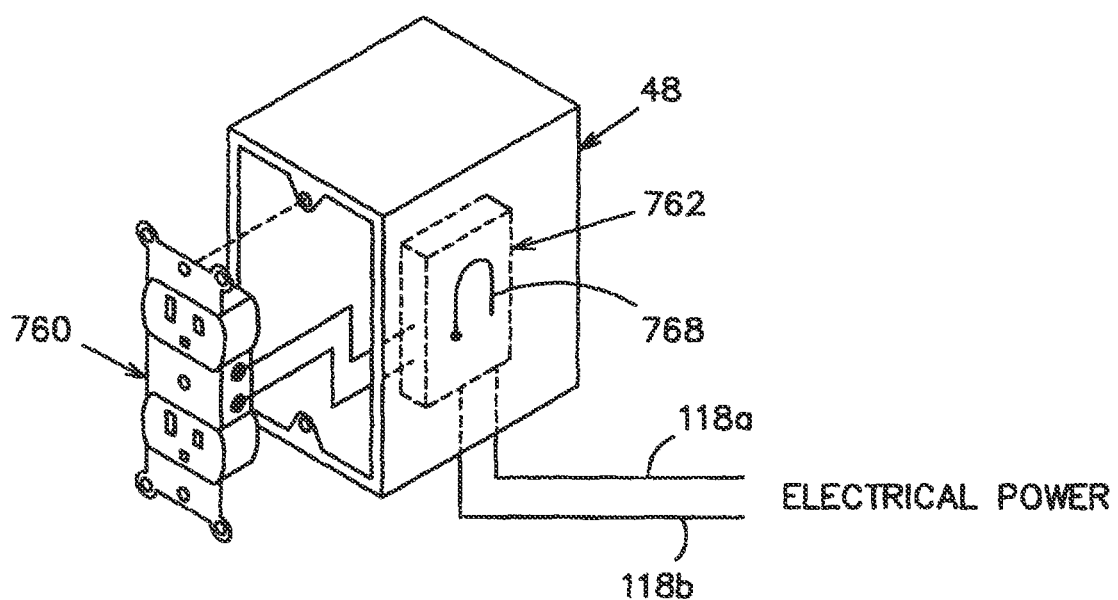

FIGS. 20A and 20B show two alternatives installations of an AC power circuit with an electrical receptacle into an electrical box 48 and both installations use wireless connections to the home Intranet. In FIG. 20A, the receptacle is integrated with the AC power circuit and forms a standalone switch module 770. The wireless Intranet connection is through an antenna 774. FIG. 20B shows a receptacle 760 is not integrated in an AC power circuit 762. FIG. 20B shows the installation of the standard electrical receptacle 760 and the AC power circuit 762 into the electrical box 48. The wireless Intranet connection is through an antenna 768. In both schemes, the AC electrical power is provided by lines 118a and 118b.

Figure 21:
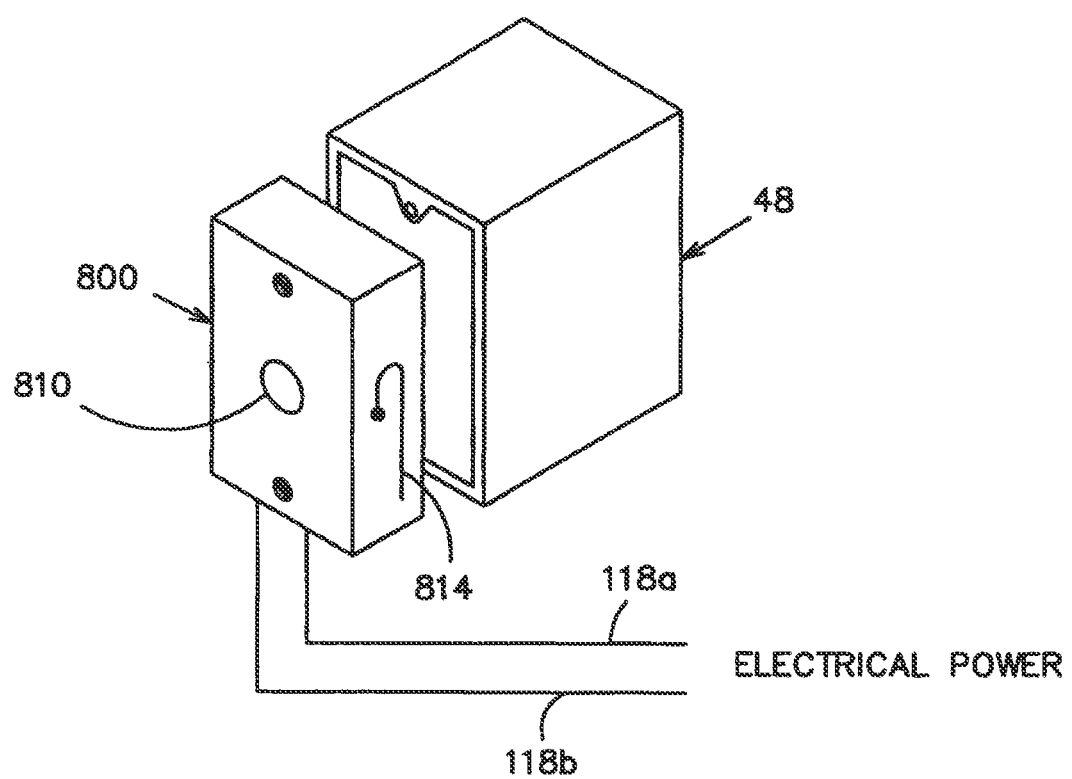
FIG. 21 is an installation of the AC power circuit with a camera sensor installed in the electrical box and is connected wirelessly to a home Intranet.

FIG. 21 shows the installation of an AC power circuit 800 into an electrical box 48. In this configuration, the AC power circuit 800 supports a camera sensor 810 and a wireless Intranet connection via an antenna 814. This embodiment would allow monitoring a room via the electrical box 48 installed in the home via the home Intranet web browsers or remote web browsers. One can detect an unwanted guest or monitor children after school.

Figure 22:
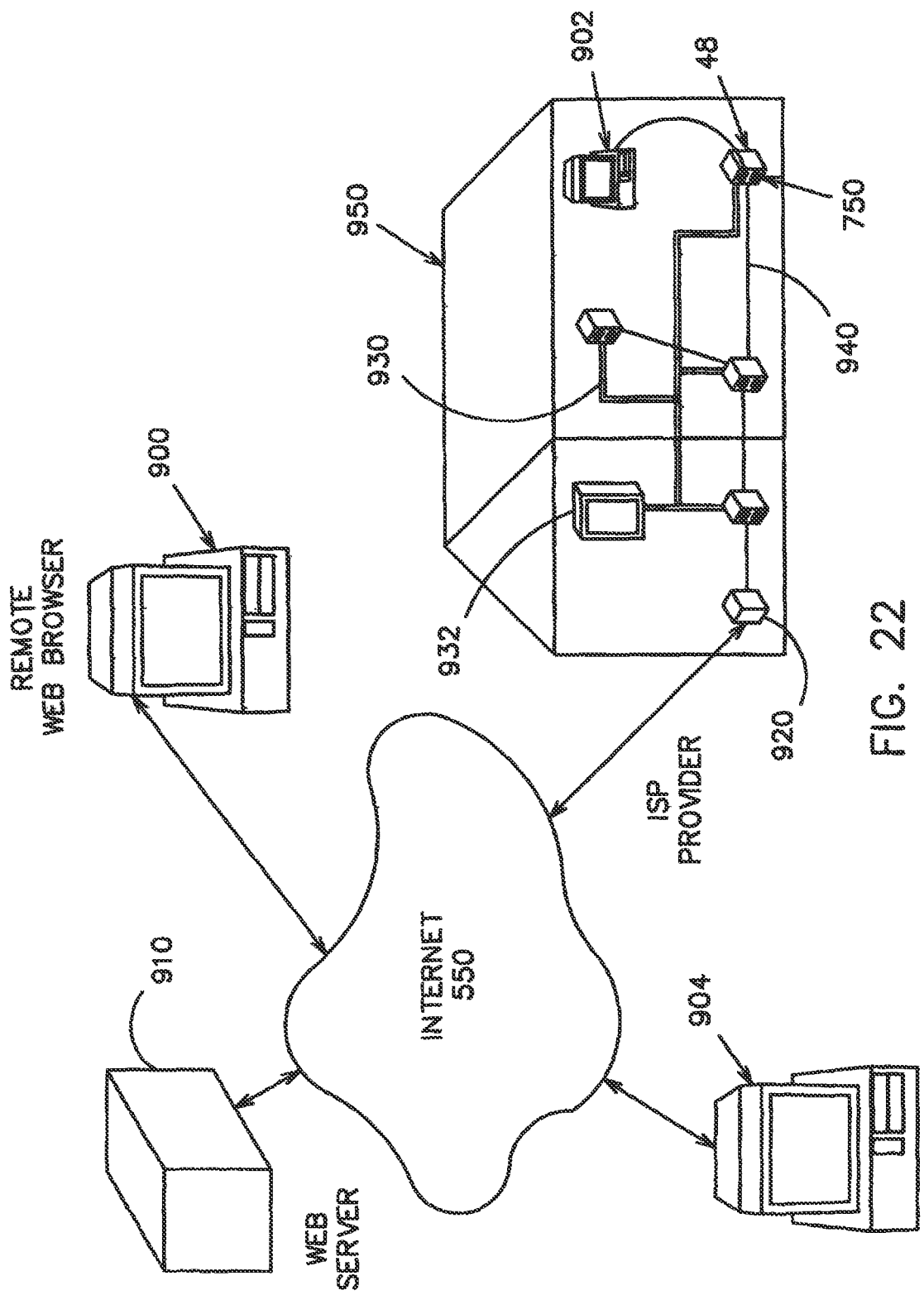
FIG. 22 is an overall diagram showing the home network attached to the electrical boxes with a wired connection and also connected to the world wide Internet.

FIG. 22 shows the connection of many AC power circuits such as AC power circuit 750 via an electrical box 48 in a home control and Intranet network 940. A computer 902 can browse the Internet 550 and connect to a web server 910 as is typical of today's networks, but also can control or monitor the electrical outlets and switches contain in electrical boxes. The house wiring 930 is showed connected to a central breaker box or house electrical panel 932. A modem 920 is connected to the Internet 550 via an ISP provider. The modem 920 may be built inside the AC power circuit in some embodiments. A remote web browser 900 can also monitor and control the electrical loads in the home 950 via the Internet 550.

Figure 23:
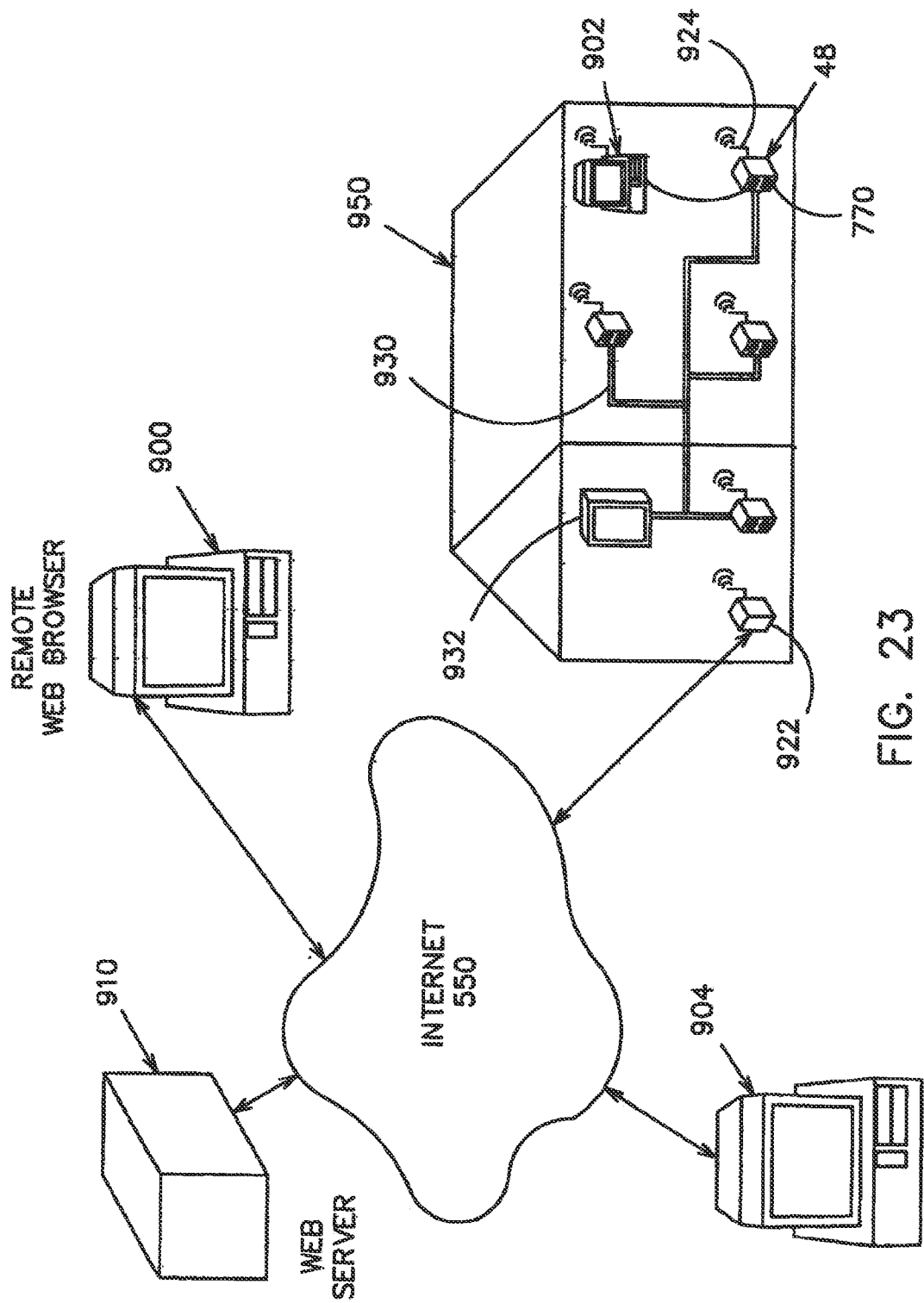
FIG. 23 is an overall diagram showing the home network attached to the electrical boxes with a wireless connection and also connected to the world wide Internet.

FIG. 23 shows the connections of many AC power circuits such as AC power circuit 770 via an electrical box 48 in a wireless home control and Intranet network 924. The computer 902 can browse the Internet 550 and control the home electrical loads in the home 950.

Figure 24:
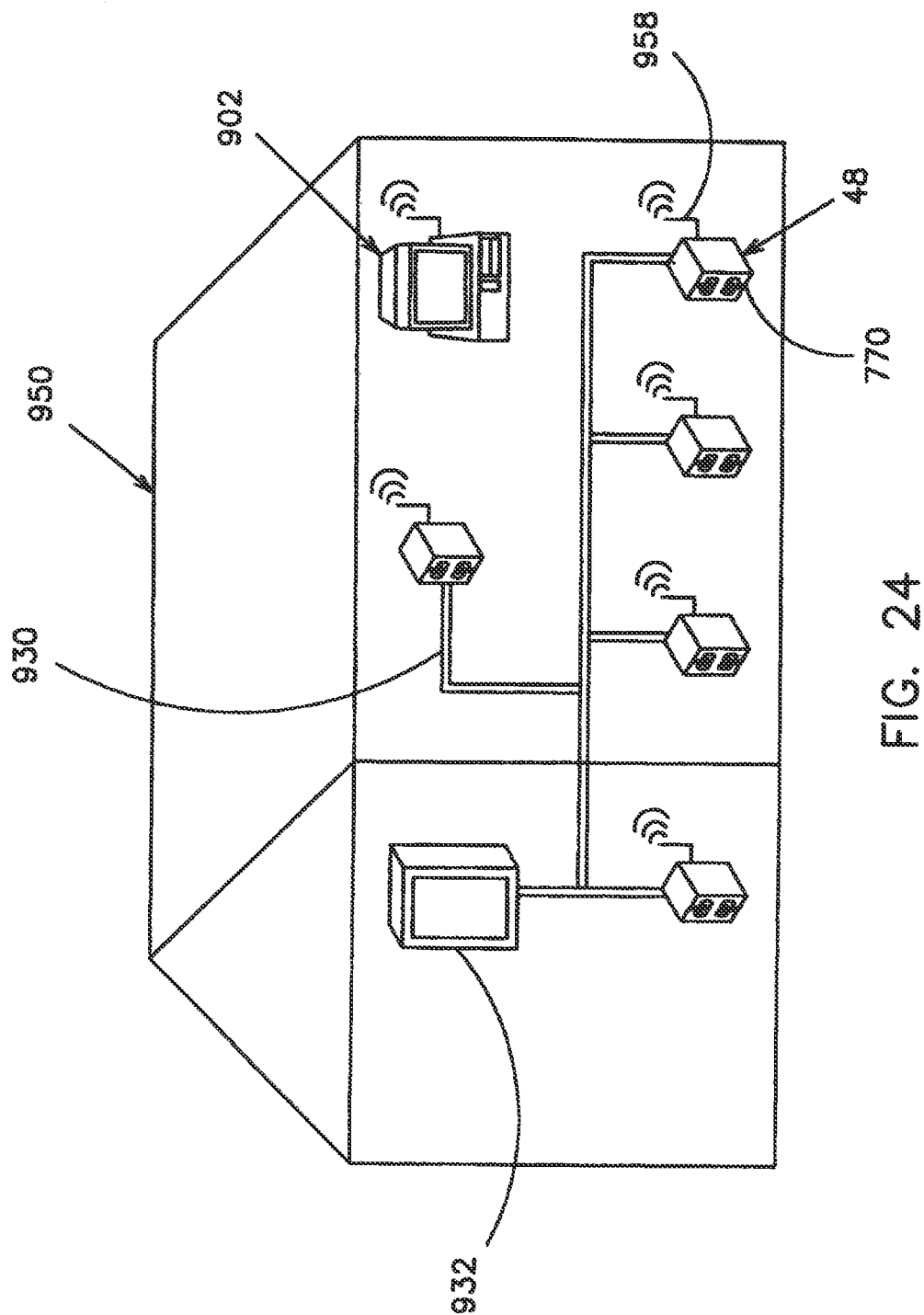
FIG. 24 is an overall diagram showing a wireless home network attached to electrical boxes.

FIG. 24 shows an embodiment where the home uses the Internet protocol and is not attached to the World Wide Internet. In this embodiment, the home wireless Intranet 958 communicates to the different electrical boxes and personal computer 902. FIG. 24 also shows an electrical box 48 that contains the AC power circuit 770.

I claim:

1. An apparatus for selectively energizing an electrical load, comprising:
   a relay coupled between current leads for controlling a flow of current to an electrical load, the relay having one state that conducts current to the electrical load to activate the load and the relay having a second state that cuts off current to the electrical load to deactivate the load;
   a bidirectional network interface for receiving control commands from an external source and for transmitting status information concerning the apparatus to the external source;
   a controller configured to:
      enable the relay,
      receive an HTTP command via the network interface, wherein the HTTP command causes the controller to control the relay, and
      generate a first web resource information that specifies interactions to the electrical load and an external sensor in response to the HTTP command; and
   circuitry coupling the relay, the network interface, and the controller,
   wherein the HTTP command specifies a second web resource information corresponding to the circuitry.

2. The apparatus of claim 1, wherein the relay comprises a triac.

3. The apparatus of claim 1, wherein the network interface comprises a standard Internet/Intranet network interface coupled to the controller.

4. The apparatus of claim 3, wherein the standard Internet/Intranet network interface operates according to a TCP/IP protocol.

5. The apparatus of claim 3, wherein the standard Internet/Intranet network interface operates according to an UDP/IP protocol.

6. The apparatus of claim 1, wherein the controller comprises at least one of an embedded controller, an embedded computer, a microcontroller, or a microcomputer.

7. The apparatus of claim 1, wherein the controller comprises:
   a storage device that stores a set of instructions; and
   at least one processor coupled to the storage device, the at least one processor being operative with the set of instructions in order to execute an application.

8. The apparatus of claim 7, wherein the application comprises a web server.

9. The apparatus of claim 7, wherein the application comprises a Simple Transport Mail Protocol application.

10. The apparatus of claim 7, wherein the application comprises a File Transport Protocol application.

11. The apparatus of claim 7, wherein the application comprises an instant messaging application.

12. The apparatus of claim 1, wherein the network interface receives the HTTP command across a wired connection.

13. The apparatus of claim 1, wherein the network interface receives the HTTP command across a wireless connection.

14. The apparatus of claim 1, wherein the electrical load is an AC electrical load.

15. The apparatus of claim 1, wherein the circuitry further couples the controller to a power network, the power network being configured to provide voltage to operate the controller.

16. The apparatus of claim 1, wherein the controller is configured to interface with an EEPROM.

17. The apparatus of claim 1, wherein the controller is configured to interface with an Ethernet controller.

* * * * *